(12) United States Patent
Hussain et al.

(10) Patent No.: US 7,535,907 B2
(45) Date of Patent: May 19, 2009

(54) TCP ENGINE

(75) Inventors: Muhammad R. Hussain, Pleasanton, CA (US); Imran Badr, Fremont, CA (US); Faisal Masood, Cupertino, CA (US); Philip H. Dickinson, Cupertino, CA (US); Richard E. Kessler, Shrewsbury, MA (US); Daniel A. Katz, Ashland, MA (US); Michael S. Bertone, Marlborough, MA (US); Robert A. Sanzone, Hudson, MA (US); Thomas F. Hummel, Marlborough, MA (US); Gregg A. Bouchard, Round Rock, TX (US)

(73) Assignee: Oavium Networks, Inc., Mountain View, CA (US)

( * ) Notice: Subject to any disclaimer, the term of this patent is extended or adjusted under 35 U.S.C. 154(b) by 651 days.

(21) Appl. No.: 11/218,727

(22) Filed: Sep. 2, 2005

(65) Prior Publication Data

US 2006/0227811 A1 Oct. 12, 2006

Related U.S. Application Data

(60) Provisional application No. 60/669,741, filed on Apr. 8, 2005.

(51) Int. Cl.
*H04L 12/28* (2006.01)
*H04L 12/56* (2006.01)
*G06F 15/16* (2006.01)

(52) U.S. Cl. .................. 370/392; 370/395.52; 370/469; 709/230

(58) Field of Classification Search .............. 370/392, 370/395.52, 469; 709/230
See application file for complete search history.

(56) References Cited

U.S. PATENT DOCUMENTS

| 5,471,593 | A | 11/1995 | Branigin et al. |
| 6,591,302 | B2 | 7/2003 | Boucher et al. |
| 6,687,833 | B1 * | 2/2004 | Osborne et al. ............... 726/23 |
| 6,701,437 | B1 | 3/2004 | Hoke et al. |
| 6,708,218 | B1 * | 3/2004 | Ellington et al. ............ 709/236 |
| 6,975,647 | B2 | 12/2005 | Neale et al. |
| 6,983,366 | B1 | 1/2006 | Huynh et al. |
| 7,007,106 | B1 | 2/2006 | Flood et al. |
| 7,127,534 | B2 * | 10/2006 | Jackson et al. ................. 710/52 |
| 7,181,544 | B2 * | 2/2007 | Vangal et al. ................ 709/250 |
| 7,190,699 | B2 * | 3/2007 | Lambrecht ................... 370/412 |

(Continued)

OTHER PUBLICATIONS

Kent, S. and Atkinson, R., Security Architecture for the Internet Protocol [online], Nov. 1998 [retrieved on Aug. 31, 2004]. Retrieved from the Internet <URL:http://www.ietf.org/rfc/rfc2401.txt>.
International Preliminary Report on Patentability, PCT/US2005/031219, mailed Mar. 22, 2007.
International Search Report, PCT/US2005/031219, mailed Feb. 13, 2006.
Written Opinion, PCT/US2005/031219, mailed Feb. 13, 2006.

*Primary Examiner*—Alpus H Hsu
(74) *Attorney, Agent, or Firm*—Hamilton, Brook, Smith & Reynolds, PC

(57) ABSTRACT

A network transport layer accelerator accelerates processing of packets so that packets can be forwarded at wire-speed. To accelerate processing of packets, the accelerator performs pre-processing on a network transport layer header encapsulated in a packet for a connection and performs in-line network transport layer checksum insertion prior to transmitting a packet. A timer unit in the accelerator schedules processing of the received packets. The accelerator also includes a free pool allocator which manages buffers for storing the received packets and a packet order unit which synchronizes processing of received packets for a same connection.

16 Claims, 17 Drawing Sheets

U.S. PATENT DOCUMENTS

| | | |
|---|---|---|
| 7,191,321 B2 | 3/2007 | Bernstein et al. |
| 7,274,706 B1 * | 9/2007 | Nguyen et al. .............. 370/419 |
| 7,337,314 B2 | 2/2008 | Hussain et al. |
| 7,366,101 B1 * | 4/2008 | Varier et al. ................ 370/241 |
| 7,376,755 B2 * | 5/2008 | Pandya ....................... 709/250 |
| 7,415,723 B2 | 8/2008 | Pandya |
| 7,424,019 B1 * | 9/2008 | Kopelman et al. .......... 370/392 |
| 7,443,836 B2 | 10/2008 | Hooper et al. |
| 2002/0133593 A1 | 9/2002 | Johnson et al. |
| 2003/0065812 A1 | 4/2003 | Beier et al. |
| 2004/0010612 A1 * | 1/2004 | Pandya ....................... 709/230 |
| 2004/0054813 A1 | 3/2004 | Boucher et al. |
| 2004/0143655 A1 | 7/2004 | Narad et al. |
| 2004/0205332 A1 | 10/2004 | Bouchard et al. |
| 2004/0205336 A1 | 10/2004 | Kessler et al. |
| 2004/0218623 A1 * | 11/2004 | Goldenberg et al. ........ 370/463 |
| 2005/0165985 A1 * | 7/2005 | Vangal et al. ............... 710/107 |
| 2005/0188102 A1 * | 8/2005 | Madajczak .................. 709/238 |
| 2006/0072563 A1 * | 4/2006 | Regnier et al. ............. 370/389 |
| 2006/0133377 A1 * | 6/2006 | Jain ........................... 370/392 |

* cited by examiner

| UNUSED 1408 | BASE 1406 | BSIZE 1404 | RID 1402 |
|---|---|---|---|

| UNUSED 1512 | ENA 1510 | CPOOL 1508 | CSIZE 1506 | INTERVAL 1504 | RID 1502 |
|---|---|---|---|---|---|

TCP ENGINE

RELATED APPLICATION(S)

This application claims the benefit of U.S. Provisional Application No. 60/669,741, filed on Apr. 8, 2005. The entire teachings of the above application(s) are incorporated herein by reference.

BACKGROUND OF THE INVENTION

The Open Systems Interconnection (OSI) Reference Model defines seven network protocol layers (L1-L7) used to communicate over a transmission medium. The upper layers (L3-L7) represent end-to-end connection-oriented communications and the lower layers (L1-L2) represent local communications.

Today's network services appliance implement comprehensive data content services with security. These include Content-aware Switching and Routing, Content-Aware Load Balancing, Deep-packet-inspection Firewall, Anti-Spam Gateway, IPsec and SSL VPN connectivity, Intrusion Detection and Protection and Anti-Virus. In addition, providing wired and wireless services and network attached data storage.

The convergence of multiple functions, and diverse services into network services appliances give rise to many challenges. First, network traffic needs to be handled at up to multi-gigabit rates. Second, deep packet inspection for all packets is required. Third, wire-speed security needs to be applied at each network layer, from Layer 2 to Layer 7. Fourth, services need to be performed at the content level.

Network processors are available for high-throughput L2 and L3 network protocol processing, that is, performing packet processing to forward packets at wire-speed. Typically, a general purpose processor is used to process L4-L7 network protocols that require more intelligent processing. One of the key building block of all Content-Aware processing is L4 processing, the Transmission Control Protocol (TCP). The Transmission Control Protocol (TCP), an L4 network protocol, is a connection oriented protocol that provides reliable in-order data delivery. Although packets may be transferred out of order over the network, or may be lost, the TCP protocol delivers the packets in order to L5-L7 layers in a reliable manner so that the L7 application receives the packets in the order that they were sent from a remote application.

The TCP protocol is based on a client/server model in which client and server processes identified by network end-points (IP address and port number) are represented as sockets. A TCP connection is set up between a client process and a server process. The TCP connection is used to transfer application data between a client process in one computer system and a server process in another computer system. To provide reliable in-order delivery, TCP requires several compute intensive tasks including computing a checksum over the entire payload in the packet, managing TCP segment buffers, and maintaining multiple timers at all times on a per connection basis. Compute intensive tasks are required to ensure reliable in-order delivery on each TCP connection and there can be many concurrent TCP connections.

Although a general purpose processor can perform the compute intensive tasks, it does not provide sufficient performance to process the data for all of the concurrent TCP connections so that it can be forwarded at wire-speed.

SUMMARY OF THE INVENTION

A network services processor accelerates packet processing for packets transferred over a network using a connection oriented protocol according to the principles of the present invention. Processing of packets is accelerated through the use of input packet processing, buffer management, synchronization of packets for a same connection and protocol checks.

An accelerator for accelerating packet processing for packets transferred over a network using a connection oriented protocol includes a packet processing unit, a free pool allocator, a packet order unit and a timer unit. The packet processing unit performs pre-processing on a network transport layer header encapsulated in a received packet for a connection. The free pool allocator manages a pool of free buffers for storing the received packets. The packet order unit synchronizes processing of received packets and the timer unit schedules processing of the received packets by at least one processor.

The network transport layer may be the Transmission Control Protocol (TCP) or the User Datagram Protocol (UDP). TCP/UDP protocol checks are accelerated by allocation of a work queue entry by the packet processing unit for the received packet. The work queue entry stores data extracted from the network transport header for use by the processor for processing the received packet. TCP/UDP protocol checks are also accelerated by performing inline network transport layer checksum insertion for the processed packet prior to transmitting the processed packet over the network.

Processing of packets is accelerated by assigning priority to pools of free buffers managed by the free pool allocator. Each pool of free buffers can have a programmable number of buffers in the free pool allocator. Each pool of free buffers may be expandable through the use of buffers in a memory accessible by the free pool allocator. Synchronization between processors is avoided through the use of a plurality of queues in the timer unit. Each timer queue may be assigned for scheduling received packets to be processed by one of a plurality of processors.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 14 is a block diagram illustrating one of the entries in the first control status register;

FIG. 15 is a block diagram illustrating one of the entries in the second control status register;

DETAILED DESCRIPTION OF THE INVENTION

A description of preferred embodiments of the invention follows.

Figure 1:
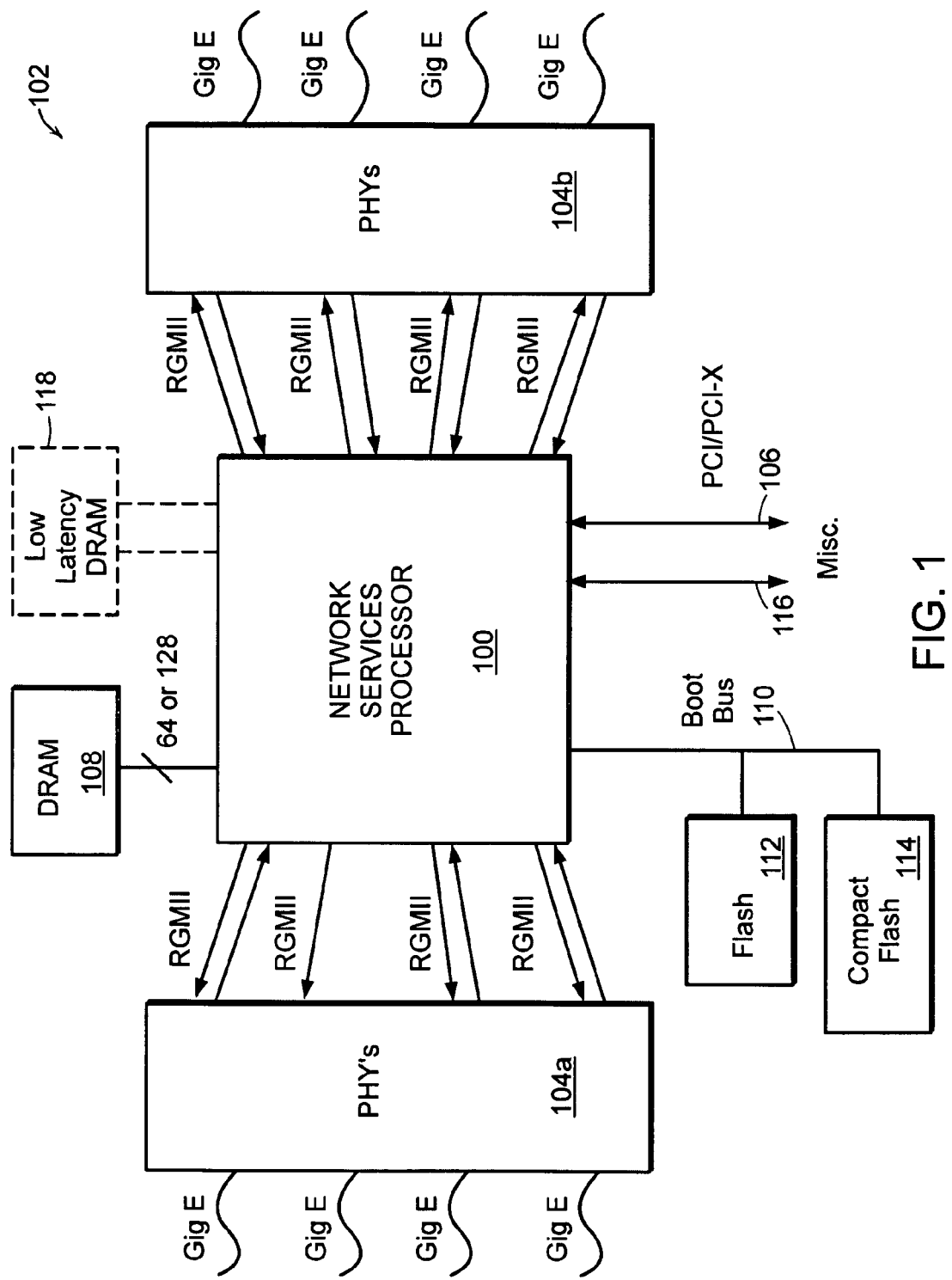
FIG. 1 is a block diagram of a security appliance including a network services processor according to the principles of the present invention.

FIG. 1 is a block diagram of a security appliance 102 including a network services processor 100 according to the principles of the present invention. The security appliance/content processing appliance 102 is a standalone system that can switch packets received at one Ethernet port (Gig E) to another Ethernet port (Gig E) and perform a plurality of security functions on received packets prior to forwarding the packets. For example, the security appliance/content processing appliance 102 can be used to perform security processing on packets received on a Wide Area Network prior to forwarding the processed packets to a Local Area Network. The network services processor 100 includes hardware packet processing, buffering, work scheduling, ordering, synchronization, and coherence support to accelerate packet processing tasks according to the principles of the present invention.

The network services processor 100 processes Open System Interconnection L2-L7 network layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor schedules and queues work (packet processing operations) for upper level network protocols, for example, L4-L7. The packet processing (work) to be performed on a particular packet includes a plurality of packet processing operations (pieces of work). Each piece of work has an associated tag. The tag allows work to be scheduled in parallel by a plurality of processor cores in the network services processor while ensuring that execution of the work is ordered and synchronized. The queuing and scheduling of the work allows processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

The network services processor 100 includes a plurality of Ethernet Media Access Control interfaces with standard Reduced Gigabyte Media Independent Interface (RGMII) connections to the off-chip PHYs 104*a*, 104*b*.

The network services processor 100 receives packets from the Ethernet ports (Gig E) through the physical interfaces PHY 104*a*, 104*b*, performs L7-L2 network protocol processing on the received packets and forwards processed packets through the physical interfaces 104*a*, 104*b* to another hop in the network or the final destination or through the PCI bus 106 for further processing by a host processor. The network protocol processing can include processing of network security protocols such as Firewall, Application Firewall, Virtual Private Network (VPN) including IP Security (IPSec) and/or Secure Sockets Layer (SSL), Intrusion detection System (IDS) and Anti-virus (AV).

A DRAM controller in the network services processor 100 controls access to an external Dynamic Random Access Memory (DRAM) 108 that is coupled to the network services processor 100. The DRAM 108 stores data packets received from the PHYs interfaces 104*a*, 104*b* or the Peripheral Component Interconnect Extended (PCI-X) interface 106 for processing by the network services processor 100. In one embodiment, the DRAM interface supports 64 or 128 bit Double Data Rate II Synchronous Dynamic Random Access Memory (DDR II SDRAM) operating up to 400 MHz double data rate.

A boot bus 110 provides the necessary boot code which is stored in flash memory 112 and is executed by the network services processor 100 when the network services processor 100 is powered-on or reset. Application code can also be loaded into the network services processor 100 over the boot bus 110, from a device 114 implementing the Compact Flash standard, or from another high-volume device, which can be a disk, attached via the PCI bus.

The miscellaneous I/O interface 116 offers auxiliary interfaces such as General Purpose Input/Output (GPIO), Flash, IEEE 802 two-wire Management Interface (MDIO), Universal Asynchronous Receiver-Transmitters (UARTs) and serial interfaces.

The network services processor 100 includes another memory controller for controlling Low latency DRAM 118. The low latency DRAM 118 is used for Internet Services and Security applications allowing fast lookups, including the string-matching that may be required for Intrusion Detection System (IDS) or Anti Virus (AV) applications.

Figure 2:
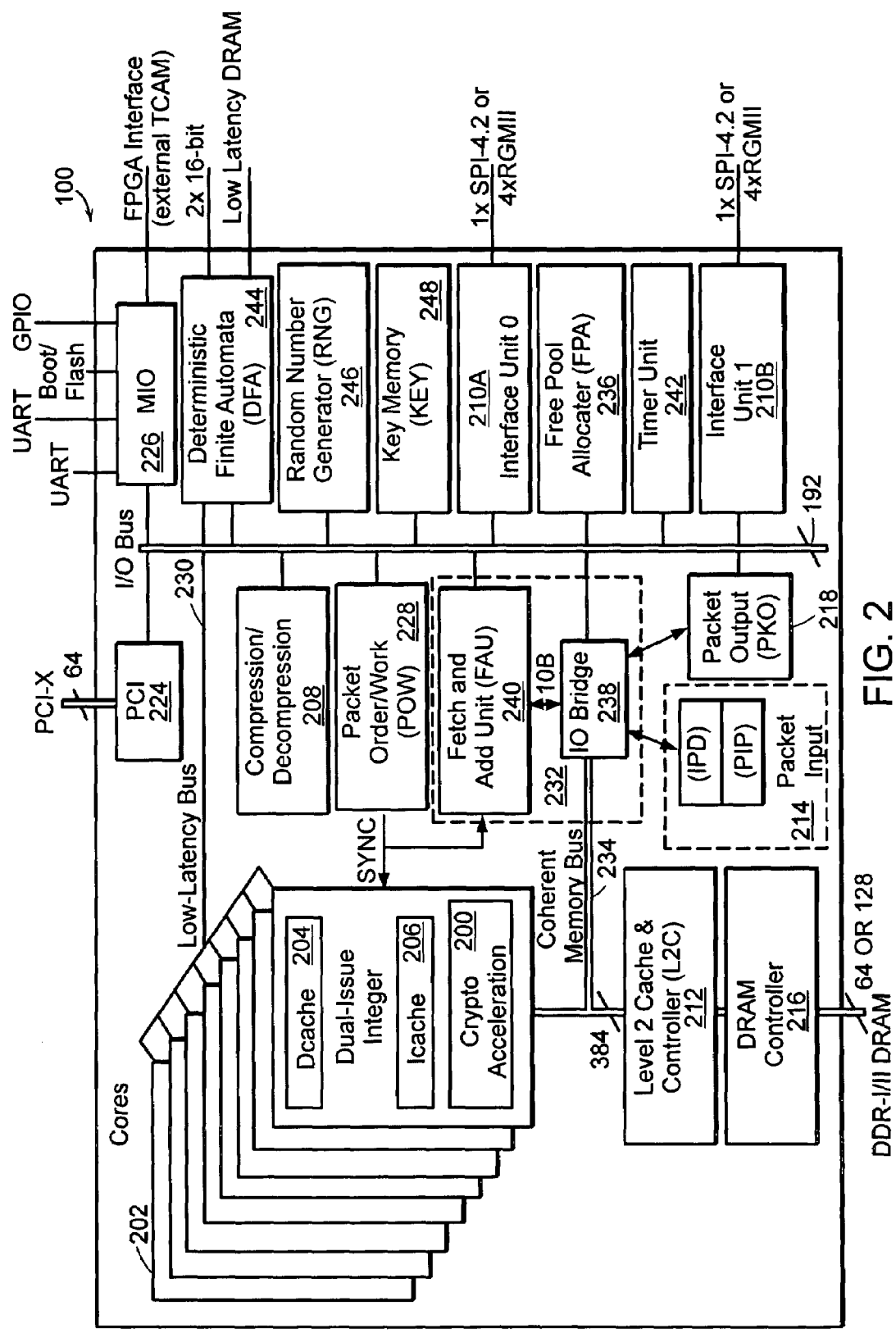
FIG. 2 is a block diagram of the network services processor shown in FIG. 1.

FIG. 2 is a block diagram of the network services processor 100 shown in FIG. 1. The network services processor 100 delivers high application performance using a plurality of processor cores 202. Network applications can be categorized into data plane and control plane operations. Each of the cores 202 can be dedicated to performing data plane or control plane operations. A data plane operation includes packet operations for forwarding packets. A control plane operation includes processing of portions of complex higher level protocols such as Internet Protocol Security (IPSec), Transmission Control Protocol (TCP) and Secure Sockets Layer (SSL). A data plane operation can include processing of other portions of these complex higher level protocols.

The Transmission Control Protocol (TCP) is an L4 network layer protocol, a connection-oriented protocol defined in Request For Comments (RFC) 793 incorporated herein by reference. TCP provides reliable and in-order byte stream transfer to upper network protocol layers (L7-L4) and is based on a client/server model. A host sets up a TCP connection between a client process (application) and a server process (application) to transfer packets over a network using the TCP protocol. Client and server processes identified by network endpoints (IP address and port number) are represented as sockets. Typically, there are thousands of concurrent TCP connections.

The network services processor 100 accelerates processing of packets for a TCP connection. The acceleration is performed in a packet input unit 214, a free pool allocator 236, a timer unit 242, a packet order work unit 208 and a packet output unit 218. The functions performed by each of these units to accelerate processing of TCP packets will be described later.

Packet Input/Output processing is performed by an interface unit 210a, 210b, a packet input unit (Packet Input) 214 and a packet output unit (PKO) 218. The input controller and interface units 210a, 210b perform all parsing of received packets and checking of results to offload the cores 202.

A packet is received by any one of the interface units 210a, 210b through a SPI-4.2 or RGM II interface. A packet can also be received by the PCI interface 224. The interface unit 210a, 210b handles L2 network protocol pre-processing of the received packet by checking various fields in the L2 network protocol header included in the received packet. After the interface unit 210a, 210b has performed L2 network protocol processing, the packet is forwarded to the packet input unit 214. The packet input unit 214 performs pre-processing of L3 and L4 network protocol headers included in the received packet. The pre-processing includes checksum checks for Transmission Control Protocol (TCP)/User Datagram Protocol (UDP) (L4 network protocols).

The interface unit 210a, 210b parses all fields in L4 and L3 network protocol headers, performs IP header checks, extracts a source port, a destination port and a protocol type from the L4 network protocol header and generates a tag that uniquely identifies the connection (TCP or UDP).

The packet input unit 214 writes packet data into buffers in Level 2 cache 212 or DRAM 108 in a format that is convenient to higher-layer software executed in at least one processor core 202 for further processing of higher level network protocols. The packet input unit 214 supports a programmable buffer size and can distribute packet data across multiple buffers to support large packet input sizes.

The packet input unit 214 allocates and creates a work queue entry for each packet. This work queue entry contains a pointer to the buffered packet stored in L2 cache 212 or DRAM 108 (FIG. 1). The work queue entry also stores all the information from the L2-L4 network protocol headers that is required for processing the packet to avoid accessing the L2-L4 network protocol headers stored with the packet in L2/DRAM 212, 108. The work queue entry will be described later in conjunction with FIG. 6.

The Packet order/work (POW) module (unit) 228 queues and schedules work (packet processing operations) for the processor cores 202. Work is defined to be any task to be performed by a core that is identified by an entry on a work queue. The task can include packet processing operations, for example, packet processing operations for L4-L7 layers to be performed on a received packet identified by a work queue entry on a work queue. Each separate packet processing operation is a piece of the work to be performed by a core on the received packet stored in memory. For example, the work can be the processing of a received Firewall/Virtual Private Network (VPN) packet. The processing of a Firewall/VPN packet includes the following separate packet processing operations (pieces of work): (1) defragmentation to reorder fragments in the received packet; (2) IPSec decryption (3) IPSec encryption; and (4) Network Address Translation (NAT) or TCP sequence number adjustment prior to forwarding the packet. Other packet processing operations, for content processing applications, can include but are not limited to server load balancing, protocol anomaly detection, content inspection, content aware switching, XML processing, and XML switching/routing.

As some packet processing operations require ordering and other packet processing operations require both ordering and synchronization, a tag is associated with each piece of work that defines the type of processing to be performed.

The POW module 228 selects (i.e. schedules) work for a core 202 and returns a pointer to the work queue entry that describes the work to the core 202. Each piece of work (a packet processing operation) has an associated group identifier and a tag.

The tag is used by the core 202 to order and synchronize the scheduled work. The tag includes a tag value and a tag type. The tag value allows work for the same flow (from a source to a destination) to be ordered and synchronized. The tag type selects how the work is synchronized and ordered. There are three different tag types: ordered (ordering is guaranteed), atomic (ordering and atomicity are guaranteed) and null (no ordering is guaranteed.) A core accesses a data structure (or has a tag) "atomically" when no other cores can simultaneously access the same data structure. Thus, atomicity guarantees that at most one core has a given tag. The initial tag associated with the work is dependent on the originator of the work. This tag can be modified through a tag switch operation initiated by a core. Through the use of tag based synchronization, the POW maintains packet order for a TCP connection.

The group identifier is used to select one or more cores to which the work can initially be scheduled. As all work is not equal, the group identifier allows different work to be performed on different cores. For example, packet processing can be pipelined from one group of cores to another, by defining the groups from which a core will accept work. A core can de-schedule scheduled work in order to transfer work from one core group to another or to avoid consuming a core for work that requires a long synchronization delay. The work is de-scheduled by the core by initiating a tag switch operation to change the tag type to null. When re-scheduling the work, the group identifier is used by the POW module to select a core to which the de-scheduled work is to be re-scheduled. The POW module is described in co-pending U.S. patent application Ser. No. 11/005,490 filed Dec. 6, 2004 entitled "Packet Queuing, Scheduling and Ordering", the contents of which are incorporated herein by reference.

After the packet has been processed by the cores 202, a packet output unit (PKO) 218 reads the packet data from L2 cache or DRAM, performs L4 network protocol post-processing (e.g., generates a TCP/UDP checksum), forwards the packet through the interface unit 210a, 210b and frees the L2 cache 212 or DRAM 108 locations used to store the packet.

The network services processor 100 also includes application specific co-processors that offload the cores 202 so that the network services processor achieves high-throughput. The application specific co-processors include a DFA co-processor 244 that performs Deterministic Finite Automata (DFA) and a compression/decompression co-processor 208 that performs compression and decompression.

Each processor core 202 is a dual-issue, superscalar processor with instruction cache 206, Level 1 data cache 204, built-in hardware acceleration (crypto acceleration module) 200 for cryptography algorithms with direct access to low latency memory over the low latency memory bus 230. The low-latency direct-access path to low latency memory 118 that bypasses the L2 cache memory 212 and can be directly accessed from both the cores 202 and a DFA co-processor 244.

The network services processor 100 also includes a memory subsystem. The memory subsystem includes level 1 data cache memory 204 in each core 202, instruction cache in each core 202, level 2 cache memory 212, a DRAM controller 216 for external DRAM memory and an interface 230 to external low latency memory. The memory subsystem is architected for multi-core support and tuned to deliver both high-throughput and low-latency required by memory intensive content networking applications. Level 2 cache memory 212 and external DRAM memory 108 (FIG. 1) is shared by all of the cores 202 and I/O co-processor devices.

Each core 202 is coupled to the L2 cache by a coherent memory bus 234. The coherent memory bus 234 is the communication channel for all memory and I/O transactions between the cores 202, an I/O Bridge (IOB) 232 and the Level 2 cache and controller 212.

A Free Pool Allocator (FPA) 236 maintains pools of pointers to free memory in level 2 cache memory 212 and DRAM. A bandwidth efficient (Last In First Out (LIFO)) stack is implemented for each free pointer pool. If a pool of pointers is too large to fit in the Free Pool Allocator (FPA) 236, the Free Pool Allocator (FPA) 236 builds a tree/list structure in level 2 cache 212 or DRAM using freed memory in the pool of pointers to store additional pointers. The FPA 236 will be described later in conjunction with FIGS. 9-15.

The I/O Bridge (IOB) 232 manages the overall protocol and arbitration and provides coherent I/O partitioning. The IOB 232 includes a bridge 238 and a Fetch and Add Unit (FAU) 240. The bridge 238 includes buffer queues for storing information to be transferred between the I/O bus, coherent memory bus, the packet input unit 214 and the packet output unit 218.

The Fetch and Add Unit (FAU) 240 is a 2 KB register file supporting read, write, atomic fetch-and-add, and atomic update operations. The Fetch and Add Unit (FAU) 240 can be accessed from both the cores 202 and the packet output unit 218. The registers store highly-used values and thus reduce traffic to access these values. Registers in the FAU 240 are used to maintain lengths of the output queues that are used for forwarding processed packets through the packet output unit 218. The FAU 240 further maintains statistical information of the TCP/IP protocol.

The PCI interface controller 224 has a DMA engine that allows the processor cores 202 to move data asynchronously between local memory in the network services processor and remote (PCI) memory in both directions.

Figure 3:
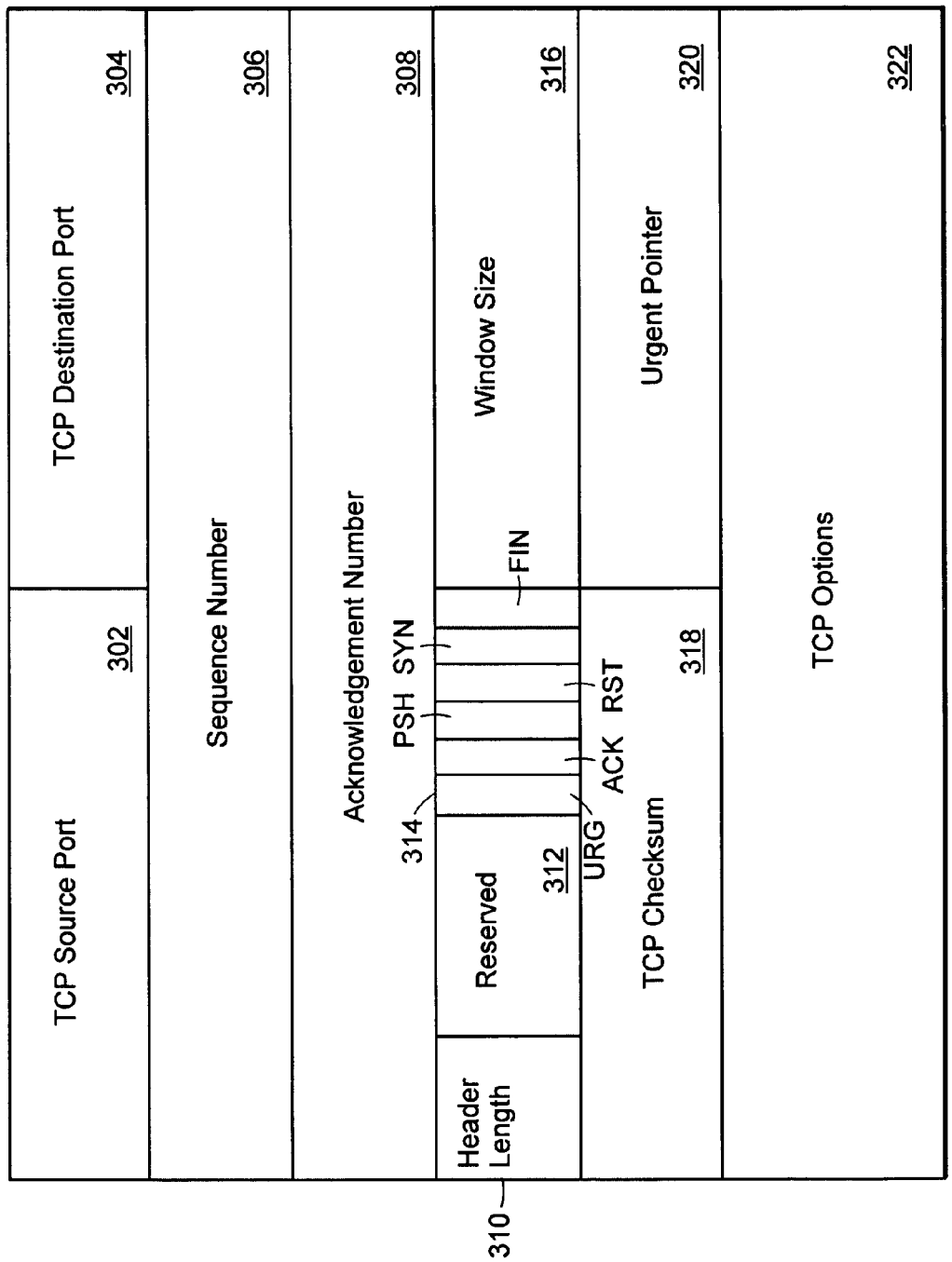
FIG. 3 is a block diagram of a L4 TCP header.

FIG. 3 is a block diagram of a L4 TCP header 300. The unit of information exchanged between TCP peers on a TCP connection is called a TCP segment. A TCP segment includes a TCP header 300 and TCP payload. The number of bytes in the TCP header 300 ranges from a minimum of 20 bytes to a maximum of 60 bytes dependent on the size of a TCP options field in a TCP header included in the TCP segment.

The TCP connection between two end points A and B is identified by a pair of flows in opposite directions. Each flow is defined as the 5-tuple made by: (1) IP Source Address, (2) IP Destination Address, and (3) IP Protocol stored in the IP header and (4) TCP Source Port 302, and (5) TCP Destination Port 304 stored in the TCP header 300. TCP/IP packets having exactly the same 5-tuple belong to the same flow. The five tuple that identifies these flows only differs in the order in which the source and destination addresses are listed.

In general, the TCP/IP protocol processing implemented by the present invention require the following tasks in per packet processing: 1) Ethernet checks (FCS); 2) ARP table lookup and interface check; 3) IP processing (including IP header checksum and malformed packet checks); 4) IP Route lookup; 5) TCP checks and validation (including TCP checksum); 6) Connection lookup; 7) TCP buffer management (allocation of mbuf substructures and freeing Acked buffers); 8) TCP connection state manipulations; 9) TCP timer handling (addition or deletion of multiple timers); and 10) Socket management (copying data back and forth from application. 11) Statistics gathering. These tasks can be divided into three categories, well defined and bounded, require flexibility, and require synchronization and scalability.

First, the present invention provides hardware offload for the following well defined and bounded, but compute intensive tasks: 1) Packet parsing to collect Ethernet, IP and TCP header information; 2) Ethernet checks (FCS); 3) IP validations (IP header checksum and malform packet checks); 4) TCP checks (TCP checksum and other checks e.g. TTL=0); 5) TCP buffer management (i.e. allocation and de-allocation of buffers for TCP/IP packet and maintaining buffer pool); 6) DMA to move data into and out of buffers for receive and transmit; 7) TCP Timer management (Addition, deletion and handling of expired timers); and 8) Data transfer to and from application space; 9) Statistics gathering. Second, the present invention provides flexible implementation of the following tasks in software: 1) ARP and Route table management; 2) TCP state machine and connection block handling; 3) Socket data structure handling; 4) Application specific TCP optimizations; and 5) Application interface. Lastly, the present invention provides a hardware based synchronization mechanism to achieve the best performance and scalability of the following tasks: 1) ARP and Route table lookup; 2) TCP connection lookup and connection block handling; and 3) Connection establishment.

TCP maintains a checksum of the entire TCP segment and segments with an invalid checksum are discarded, that is, not acknowledged. TCP segments are sent in IP datagrams. One segment fits into a single (non fragmented) IP packet. As IP datagrams can be lost, when a segment is sent, a timer is maintained and if acknowledgement of reception is not received, the segment is transmitted again after timeout. IP datagrams can arrive out of order and so can TCP segments but must be passed to the application in order. IP datagrams can be duplicated but a receiver of TCP segment must discard duplicate segments. TCP also provides flow control i.e. each end of the connection has a finite memory for storing segments and a sender is not allowed to send more than that.

Standard BSD socket API calls such as socket( ), bind( ), listen( ), accept( ), write( ) and close( ) are called by applications executing in a host system to set up a TCP connection to transfer data between a client process and a server process.

These API calls are well known to those skilled in the art and beyond the scope of the present invention.

Client and server processes (applications) identified by network endpoints (IP address and port number) are represented as sockets. A socket is set up for a particular domain and network protocol for example, UDP or TCP. The server process is identified by binding an IP address and port number to the socket. After the server process is bound to the socket, the socket can be used to listen for new TCP/UDP connection requests and to service them.

Referring to FIG. 3 data received from an application for a TCP connection to be transmitted over the network 108 is broken into smaller chunks and a TCP header 300 is added to each chunk (packet segment). The TCP header 300 includes a TCP source port 302 and a TCP destination port 304. For example, there are well-known ports for standard layer 7 applications such as, Telnet, File Transfer Protocol (FTP) and Simple Mail Transfer Protocol (SMTP).

The sequence number field 306 stores a unique sequence number for each packet allowing the packets to be reassembled in sequence at the destination port. The sequence number is used to keep track of the order of the packets. Packets are transmitted by the sender in order but may take different routes over the network. The TCP layer uses the sequence number 306 to re-order the packets. The sequence number identifies the byte in the data stream and is a 32-bit unsigned number that wraps around to 0 after reaching $2^{32} -1$. Each direction of data flow maintains its own sequence number.

The acknowledgement number field 308 stores the sequence number of the next packet expected by the sender of the ACK. Acknowledgements are sent with each data transmission on an established connection. The header length field 310 stores the number of 32-bit words in the TCP header 300.

The flags field 314 indicates start, end or reset of a TCP connection or desired type of service. The TCP flags field 314 includes one or more flags that can be set at the same time. The flags include an URG flag indicating whether the urgent pointer is valid; an ACK flag indicating whether the acknowledgement number in the TCP header is valid; and a PSH flag indicating whether data should be passed to application as soon as possible instead of waiting for more data to come. The PSH flag is typically set when a sender's buffer is empty. The RST flag indicates whether there is a reset connection; the SYN flag indicates whether to synchronize sequence number for connection start; and the FIN flag indicates whether the sender is closing the connection.

The window size field 316 provides precise flow control by indicating the number of bytes that the receiver can receive on a connection. The Window Size is a 16-bit field storing the number of bytes that receiver can accept (starting from ACK number). The window size is limited to 65535 bytes and can be scaled.

The TCP checksum field 318 is used to determine whether the packet has been corrupted during transmission. The TCP Checksum covers the entire segment plus a 12-byte pseudoheader that includes IP source and destination header, protocol, and TCP segment length. The TCP checksum is calculated as a ones complement sum of 16-bit words by the sender and is verified by receiver. If the calculated length is not a multiple of 16-bit words, a zero byte is padded for calculation only.

The urgent pointer field 320 indicates the location in the stream of received data at which urgent data ends. The Urgent Pointer field is valid only if the URG flag is set in the flags field 314. It is a way to transmit emergency data to the other end of the TCP connection. The urgent pointer points to the last byte of urgent data. Urgent data can be sent even if available window size is zero. The options field 322 is used to transmit optional control data, for example, the maximum TCP segment size.

A TCP connection is established by the exchange of three TCP segments and is typically referred to as a three-way handshake: (1) The first TCP segment is referred to as the first SYN. The side that sends the first SYN (client); that is a TCP segment in which the SYN flag is set in the flags field 314, and valid source and destination ports and an initial sequence number (ISN) are specified, is said to perform an active open. (2) The second TCP segment is referred to as the SYN/ACK segment. The side that receives the first SYN and sends back the next SYN (server), i.e., ACK-ing the received SYN, thus transmitting the SYN/ACK packet, performs a passive open. The TCP segment includes valid source and destination ports, an initial sequence number (ISN), an acknowledge number (client's ISN plus one) and the SYNC and ACK bits are set. (3) The third TCP segment is referred to as the ACK segment in which the client ACKs the server's SYN/ACK. The TCP segment includes the acknowledge number (server's ISN plus one) and the ACK flag is set.

To provide reliable in-order delivery, TCP requires several compute intensive tasks including computing a checksum over the entire payload in the TCP segment, managing TCP segment buffers, and maintaining multiple timers at all times on a per TCP connection basis. The network services processor 100 accelerates these compute intensive tasks through the use of buffer management, TCP timer management, input packet processing, tag based synchronization and TCP protocol checks. FIG. 3 is a block diagram illustrating in more detail the units for performing input and output packet processing in the network services processor shown in FIG. 2.

As already discussed in conjunction with FIG. 1 and FIG. 2, packets (segments) are received through any one of the interfaces units 210a, 210b or the PCI interface 224. The interface units 210a, 210b and packet input unit 214 perform parsing of received packets and check the results of the parsing to offload the cores 202. The interface unit 210a, 210b checks the L2 network protocol trailer included in a received packet for common exceptions. For example, the Frame Check Sequence (FCS) field in the L2 network protocol trailer stores the result of a CRC calculation on the bits of the frame performed by the sender of the packet. The interface unit 210a, 210b performs the same CRC calculation of the received packet and compares the result with the value stored in the FCS field. The interface unit 210a, 210b may not accept the packet if an error is detected, that is, the packet is dropped. If the interface unit 210a, 210b accepts the packet, the Free Pool Allocator (FPA) 236 provides a pointer to free (available) memory in L2 cache memory or DRAM for storing the packet and the packet is stored in memory. The FPA 236 will be described later in conjunction with FIGS. 11-15.

The packet input unit 214 includes a Packet Input Processing (PIP) unit 302 and an Input Packet Data unit (IPD) 300. The packet input unit 214 uses a pointer to free memory from one of the pools of pointers in the FPA 236 to store received packet data in level 2 cache memory or DRAM and another pool of pointers to allocate work queue entries. Work queue entries will be discussed later in conjunction with FIG. 6. The FPA 236 will be discussed later in conjunction with FIGS. 11-15.

The I/O busses include an inbound bus (IOBI) and an outbound bus (IOBO), a packet output bus (POB), a PKO-specific bus (PKOB), an input packet data bus (IPDB), and associated controls. The interface unit 210a, 210b places 64-bit packet segments from the received packets onto the IOBI bus. The IPD 400 in the packet input unit 214 latches each 64-bit packet segment from the IOBI bus for processing. The IPD 400 accumulates the 64 bit packet segments into 128-byte cache blocks. The IPD 400 then forwards the cache block writes on the IPDB bus. The I/O Bridge 232 forwards the cache block write onto the Coherent Memory Bus (CMB).

The packet input unit 214 performs pre-processing of L3 and L4 network protocol headers included in the received packet. For example, L3 network protocol pre-processing for an IP header includes checking the IP version field to determine if the IP version is version 4 or version 6, verifying the header checksum field that the value stored in the Time To Live (TTL) field is greater than zero, and checking the option fields. The packet input unit 214 supports Internet Protocol version 4 (IPv4) and Internet Protocol version 6 (IPv6) traffic. The PIP/IPD performs L4 checking on received packets. L4 pre-processing for TCP/UDP header includes verifying the port number fields 402, 404, the checksum field 418, the value stored in the header length field 310 and the flags field 414.

The packet input unit 214 also extracts values stored in fields in the L3 and L4 network protocol headers and stores them in a work queue entry associated with the TPC segment for further processing by the cores 202. The work queue entry will be described later in conjunction with FIG. 12. Once the packet input unit 214 receives a packet, it writes a copy of it into L2/DRAM buffers. The packet input unit receives the buffers from a free pool managed by the FPA unit.

Figure 5:
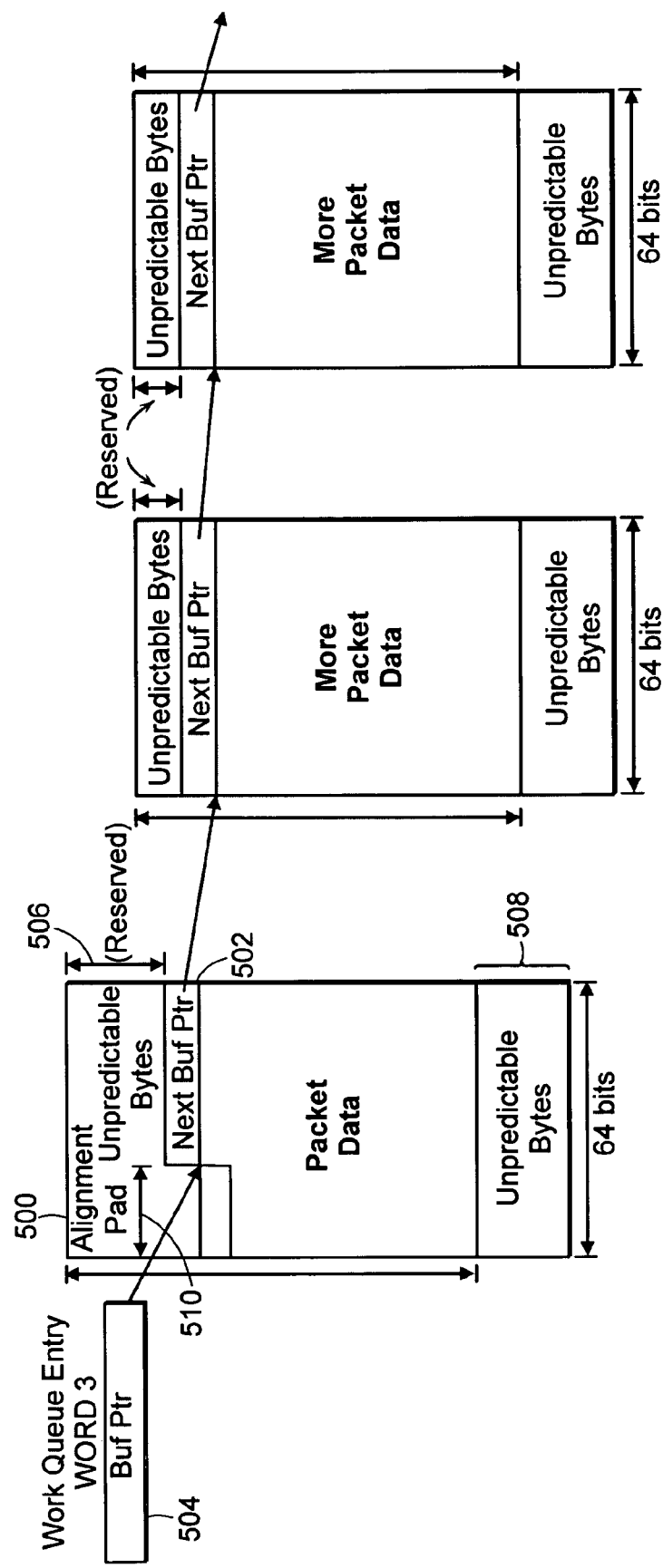
FIG. 5 illustrates how a large packet is written to L2/DRAM.

FIG. 5 illustrates how a large packet is written to L2/DRAM. In the example shown in FIG. 5, the packet is too large to fit into a single buffer 500 and is so large that it does not even fit into three buffers 500. The packet input unit 214 requests multiple buffers 500 from the FPA unit, writes the packet data into the buffers and links the buffers together with next buffer pointers 502. The buffers are linked together with buffer pointers. The first buffer pointer is written into the work queue entry created for the packets and subsequent buffer pointers are written in the buffer before the first byte of packet data stored in the buffer. The packet input unit 214 places a pointer to the first buffer 504 storing the packet data in the work queue entry created to signal the arrival of the packet. This work queue entry also indicates the number of buffers 500 used to store the packet data and the total packet length in bytes. The format of the buffer pointer will be described later in conjunction with the description of the work queue entry.

The packet input unit 214 stores packets into buffers contiguously but leaves space at the top 506 and bottom 508 of a buffer if desired. The number of bytes in the spaces at the top and bottom is configurable. The packet input unit 214 writes data to L2/DRAM in 128 byte cache blocks. The number of cache blocks written to L2 cache is also configurable.

The alignment pad 510 in the first buffer storing the packet is selected to place the packet data at a convenient alignment for processing by a core 202. For example, for an IPv4 packet, the alignment pad is set to 4 bytes and for an IPv6 packet, the alignment pad is set to 0 bytes.

A work queue entry is added to a work queue by the packet input unit 214 for each packet arrival. The work queue entry is the primary descriptor that describes work to be performed by the cores. The work queue entry may be created by the PIP/IPD module 214 for a TCP segment received through an interface unit 210a, 201b or may be created by a core 202. The PIP/IPD module 214 submits the work that is identified by the work queue entry to the Packet order/work (POW) unit 228 for each packet arrival.

Returning to FIG. 4, the Packet Order/Work (POW) unit 228 implements hardware work queuing, hardware work scheduling and tag-based synchronization and ordering to queue and schedule work for the cores. Work identified by a work queue entry stored in L2 Cache/DRAM enters the Packet Order/Work (POW) unit 228 through one of a plurality of POW input queues. In an embodiment, there are 8 POW input queues and the POW module includes 2048 POW entries. The POW is described in co-pending U.S. patent application Ser. No. 11/005,490 filed Dec. 6, 2004 entitled "Packet Queuing, Scheduling and Ordering", the contents of which are incorporated herein by reference. The POW module 228 uses POW entries to order, schedule, and synchronize work identified by work queue entries. The POW module 228 stores a pointer to a work queue entry in a POW entry and provides the pointer to a work queue entry to the core in response to a request from the core for work.

The different POW input queues can be used to provide different service levels. The Packet Input Processing (PIP) unit 302 can classify packets into one of the eight input work queues in the POW 228 using default values, Virtual Local Area Network (VLAN) priorities and IP Diffserve values configurable on a per-port basis.

The timer unit 242 is used to schedule work for the cores and is integrated with work queuing in the POW unit to efficiently manage timers for TCP connections. The Timer unit manages a plurality of rings, each ring having a programmable number of buckets. The rings are stored in level 2 cache memory 212 or DRAM 108 (FIG. 1). Each bucket stores a list of timer entries. Each timer entry stores a work queue entry pointer. The time period between buckets in each ring is programmable. At each periodic bucket time expiration, the next bucket in the ring is processed and the work defined by the work queue entry pointers stored in the timer entries in the bucket is scheduled. The timer unit will be described later in conjunction with FIGS. 8-10.

Figure 6:
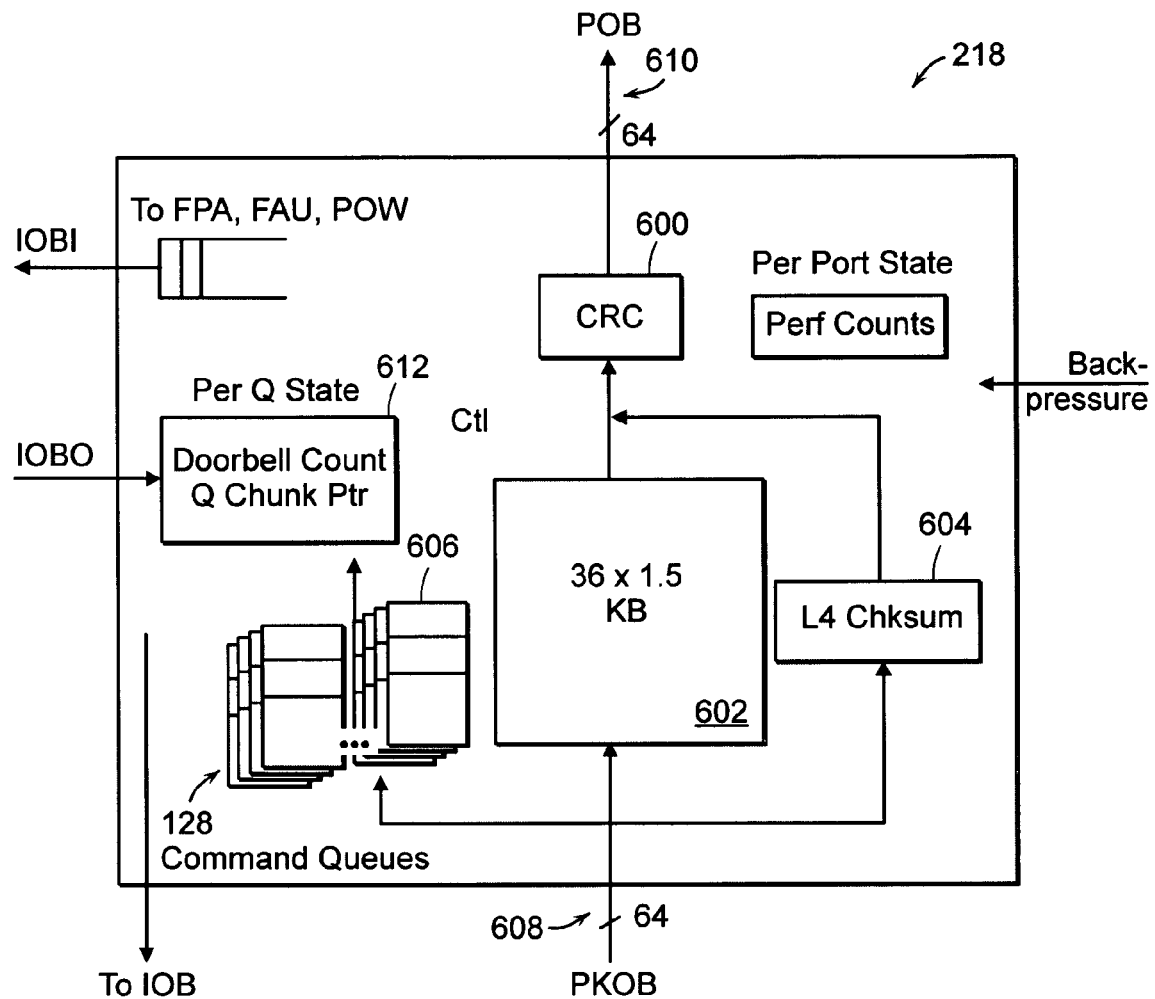
FIG. 6 is a block diagram of the Packet Output unit (PKO) in the network services processor shown in FIG. 2.

FIG. 6 is a block diagram of the Packet output unit (PKO) 218 shown in FIG. 3. The PKO unit 218 has multiple command queues 606 per port and an inline L4 checksum generator 604. In one embodiment, the PKO supports up to 128 queues to buffer packets to be sent out to the 36 egress (output) ports. Each egress port can be configured to have multiple queues and each queue can be configured with different priorities. The packet data and queue commands enter the PKO unit 218 from Level 2 cache/DRAM on the PKOB bus 608.

The PKO unit 218 buffers the packet data (PKOB) received from the I/O Bridge 232 in an internal buffer 602 and transfers it to the output port via the Packet Output Bus (POB) bus 610. The PKO unit 218 also calculates the L4 checksum for a TCP/UDP packet. If the entire packet fits inside the internal buffer 602, the PKO unit 218 buffers the entire packet in the internal buffer 602, and performs inline L4 checksum insertion, that is, calculates the checksum and inserts the computed checksum as it reads the packet from its internal buffer and sends the packet out on the POB bus. If the entire packet does not fit inside the internal buffer, the PKO reads the packet twice from Level 2 cache/DRAM. It calculates the checksum during the first read operation, the data from the second read flows through the internal buffer and immediately out to the POB bus, and the checksum logic 604 inserts the checksum as it is sent out.

Figure 7:
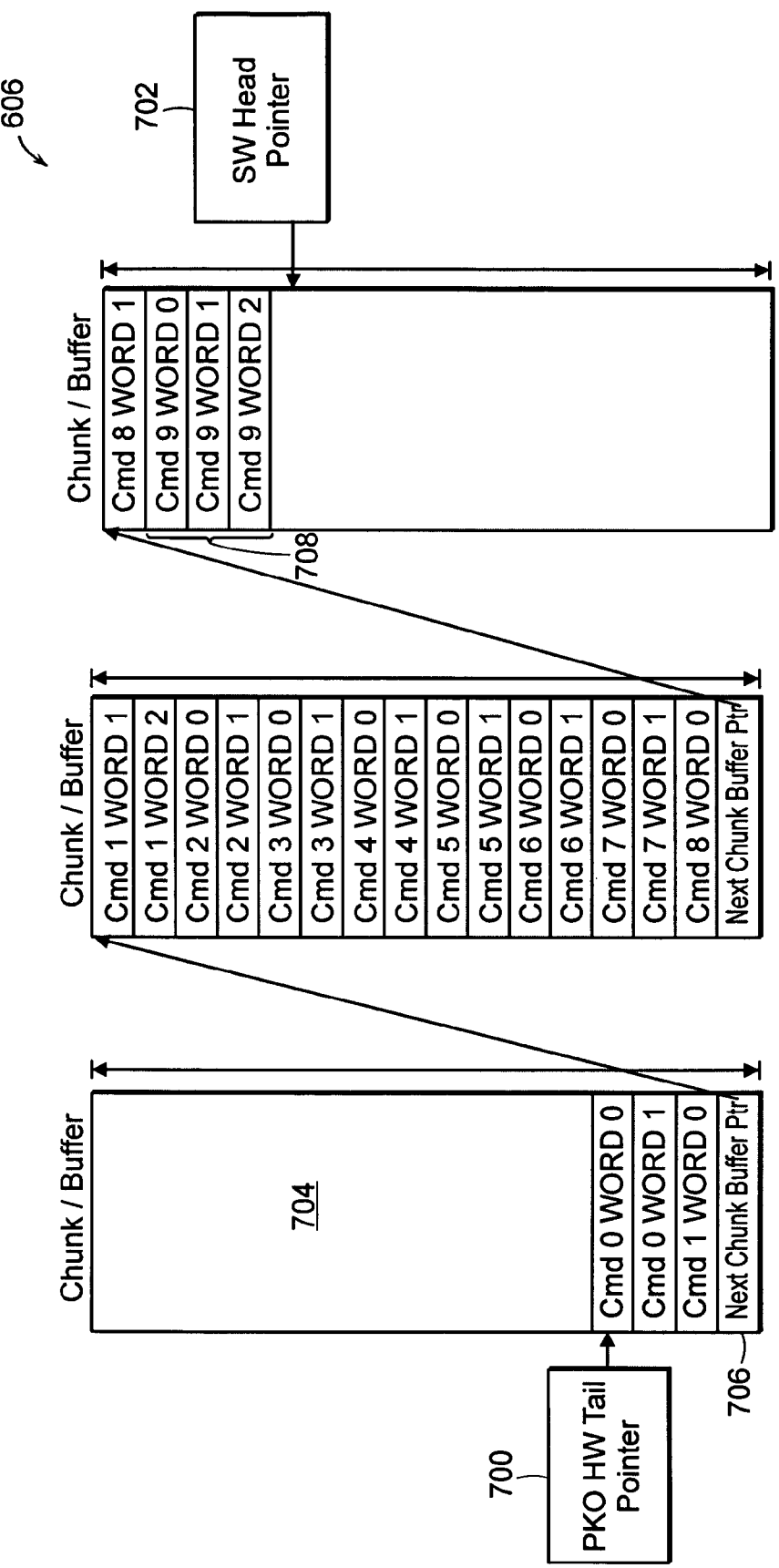
FIG. 7 is a block diagram illustrating the structure of one of the command queues in the PKO unit.

FIG. 7 is a block diagram illustrating the structure of one of the command queues 606 in the PKO unit 218. Each queue 606 is a linked list of chunks or buffers 704 that are allocated by software and freed by the PKO unit 218. The PKO unit 218 reads words from the command queue starting at the tail pointer 700 and traverses the next chunk buffer pointer to the next chunk when it reaches the last word of a chuck. After moving to the next chunk the prior chunk is freed by returning it to the pool of free buffers managed by the FPA unit.

Each command includes the information that the PKO unit needs to send out a single packet. In the example shown in FIG. 7, there are ten commands 708 in the queue 606. The commands are numbered zero to nine, with the smaller numbers corresponding to the older commands. The packets for the older commands are sent first. Each command has a minimum of two words and a maximum of three words (labeled 0-2). The PKO unit 218 manages the tail pointer 700 for the queue and the software maintains the head pointer 702.

Software executed by one of the processors 202 inserts a packet into a queue by writing command words for the packet into the queue and then writing a doorbell address 612 for the queue with the number of words added to the queue.

The distance between the head pointer 700 and the tail pointer 702 is both the size of the output queue 606 and the outstanding doorbell count. The size of the output queue is limited only by the available memory and the number of bits in the counter 612 (FIG. 6). Software can "ring the doorbell" with any number of command words. A doorbell write can be issued for each command or words from multiple commands can be accumulated into a single doorbell write.

Only one queue is shown in FIG. 6, in one embodiment, the number of queues is selectable and either 128, 64 or 32 queues can be selected.

Figure 8:
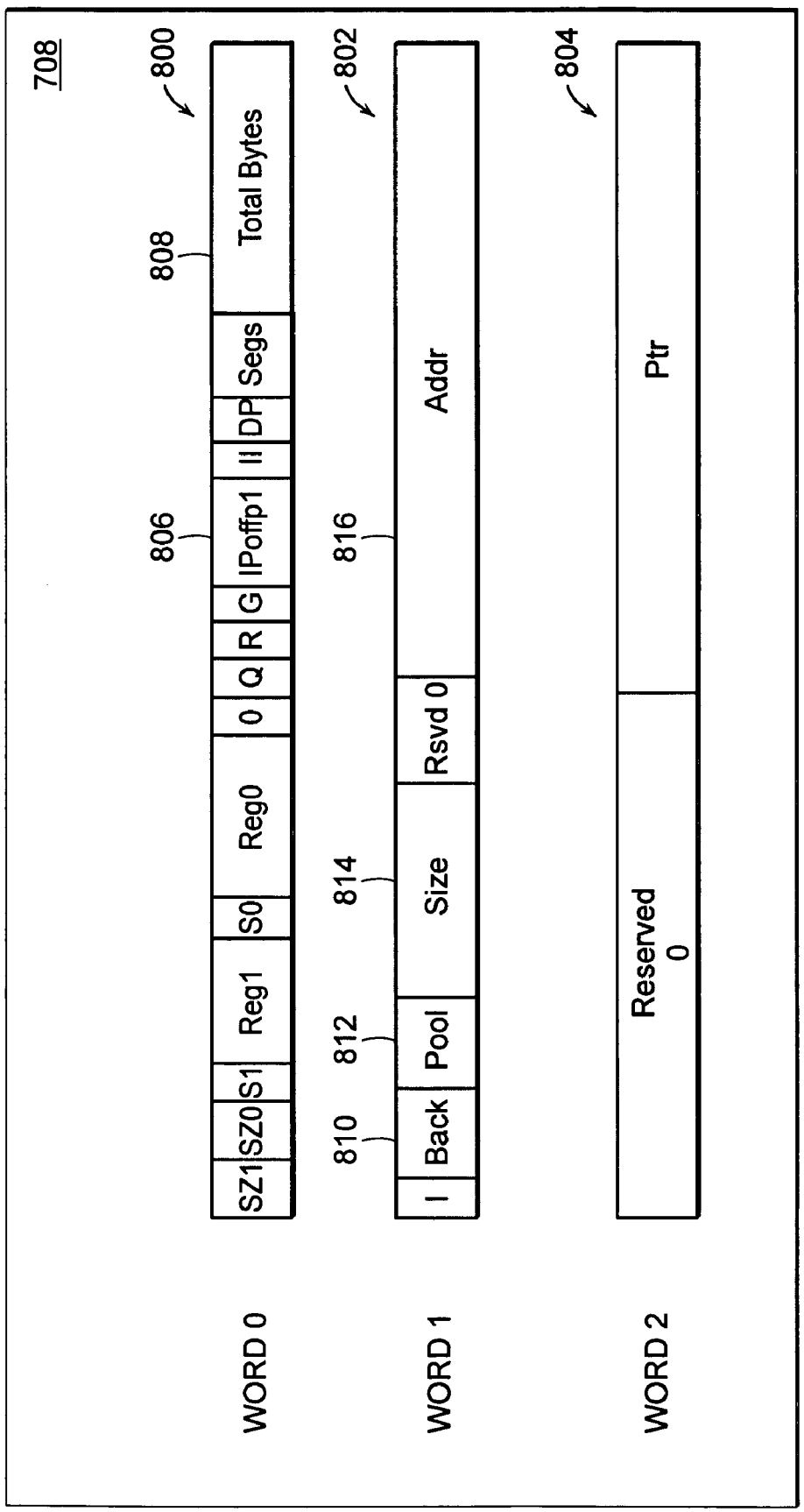
FIG. 8 illustrates the format of one of the commands on the command queue shown in FIG. 7.

FIG. 8 illustrates the format of one of the commands 708 on the command queue 606 shown in FIG. 7. The command 708 includes three words 800, 802, 804 labeled 0-2. Word 800 is included in every command. Field labeled Q in word 800 indicates whether word 2 804 stores a pointer to a work queue entry. If so, the PKO unit 218 submits the work to the POW after the packet is sent. Field labeled R in word 800 indicates whether word 802 is included in the command. Field labeled G in word 800 indicates whether the PKO unit 218 operates in linked or gather mode for the packet. In either case, the PKO unit reads packet segments from L2/DRAM and can optionally free the buffers storing the segments to one of the free pools managed by the FPA. The free pool selection and the decision whether to free the buffer storing a segment can be made on a segment-by-segment basis. A command can also specify whether to free buffers on a command-by-command basis.

If set to gather mode, word 800 stores a pointer to a gather list. If not set to gather mode, the PKO unit operates in linked mode, and word 802 stores a pointer to the first segment. The state of the IFoffp1 field 806 indicates whether the PKO unit 218 calculates the TCP/UDP checksum for a packet and specifies the location of the first byte of the IP packet. If the IFoffp1 field 806 is zero, the PKO unit 218 does not insert a TCP/UDP checksum into the packet.

The II field in word 800 indicates whether the I bit is ignored in all segment and gather pointers. The DF field in word 800 indicates whether default buffers should not be freed for all segments. The segs field in word 800 stores the number of segments or number of entries in the gather list. The total bytes field 808 stores the number of bytes in the packet associated with the command 708.

Word 802 stores a segment pointer in the address field 816. The address field stores the byte address of the start of the segment. The pool field 812 indicates the free buffer pool to which the buffer is freed. The back field 810 stores the distance from the start of the segment to the start of the buffer. The size field 814 stores the size of the segment in bytes. The next buffer pointers discussed in conjunction with FIG. 5 have the same format as word 802.

Word 804 stores a L2/DRAM pointer that is used after the PKO unit 218 sends the packet out. If the Q field and R field of word 800 are set, the pointer points to a work queue entry that the PKO unit 218 will add to a POW output work queue.

Figure 9:
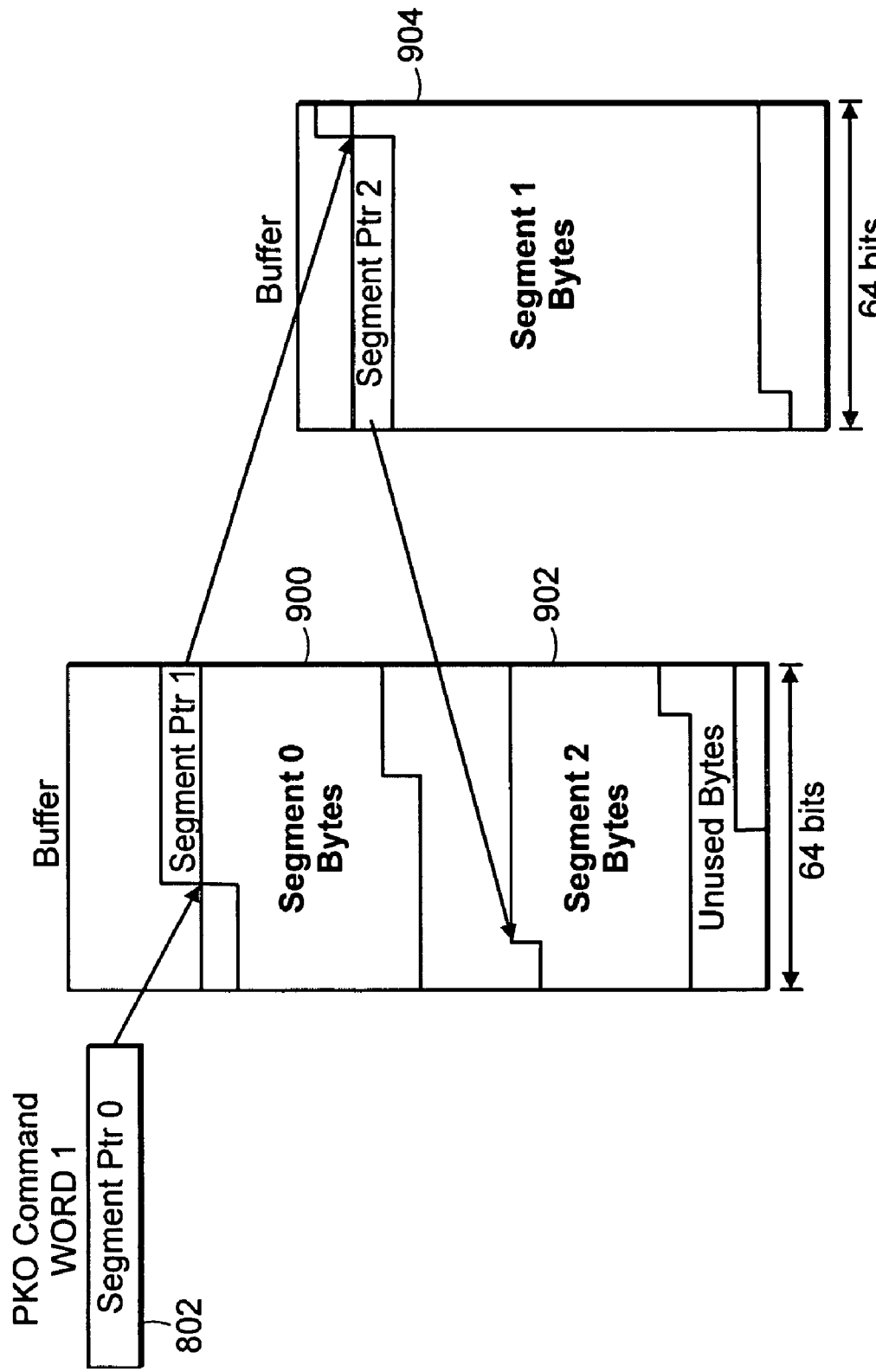
FIG. 9 illustrates an example of the use of linked mode to send three segments.

FIG. 9 illustrates an example of the use of linked mode. In the example, shown a packet is the concatenation of all of segment bytes 900, all of segment bytes 904 and the first bytes of segment 902. The segment pointer stored in word 802 of the PKO command 708 stores a pointer to segment 900. Each segment is contiguous bytes which, except for the last segment 902 are preceded by a 64-bit pointer to the next segment.

The PKO unit 218 reads packets from L2/DRAM memory and passes them out a port whenever one of the queues associated with the port has a valid command. As discussed in conjunction with FIG. 6, each command can specify whether the PKO unit 218 should calculate and insert the TCP/UDP checksum.

Figure 10:
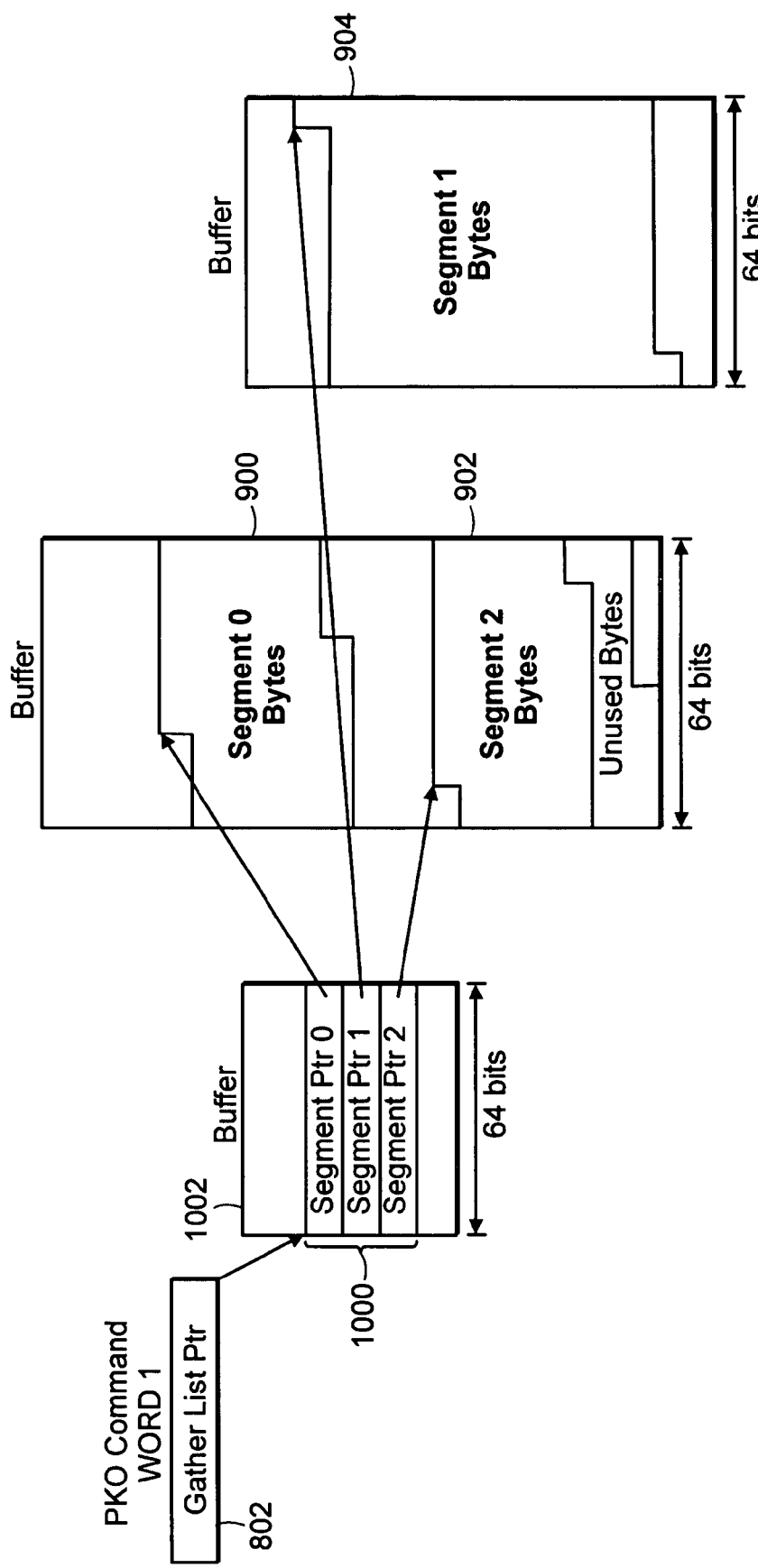
FIG. 10 illustrates the use of gather mode to send the three segments shown in FIG. 9.

FIG. 10 illustrates the use of gather mode to send the three segments shown in FIG. 9. In gather mode there are no segment pointers preceding any segment data. Instead, all segment pointers are stored in a gather list 1000. The buffer 1002 storing the gather list 100 is also freed to the free pools managed by the FPA. The pointer stored in word 902 of the command points indirectly to the gather list 100 rather than directly to the first segment 900.

As shown in FIG. 9 and FIG. 10, a segment can be as small as one byte and can start on any byte alignment, in contrast to a buffer which starts on a 128 byte boundary and be at least 128 bytes. Thus, multiple segments can reside in a single buffer and only the last segment in the list (in both linked and scatter mode) can direct the PKO unit 218 to free the buffer.

Figure 11:
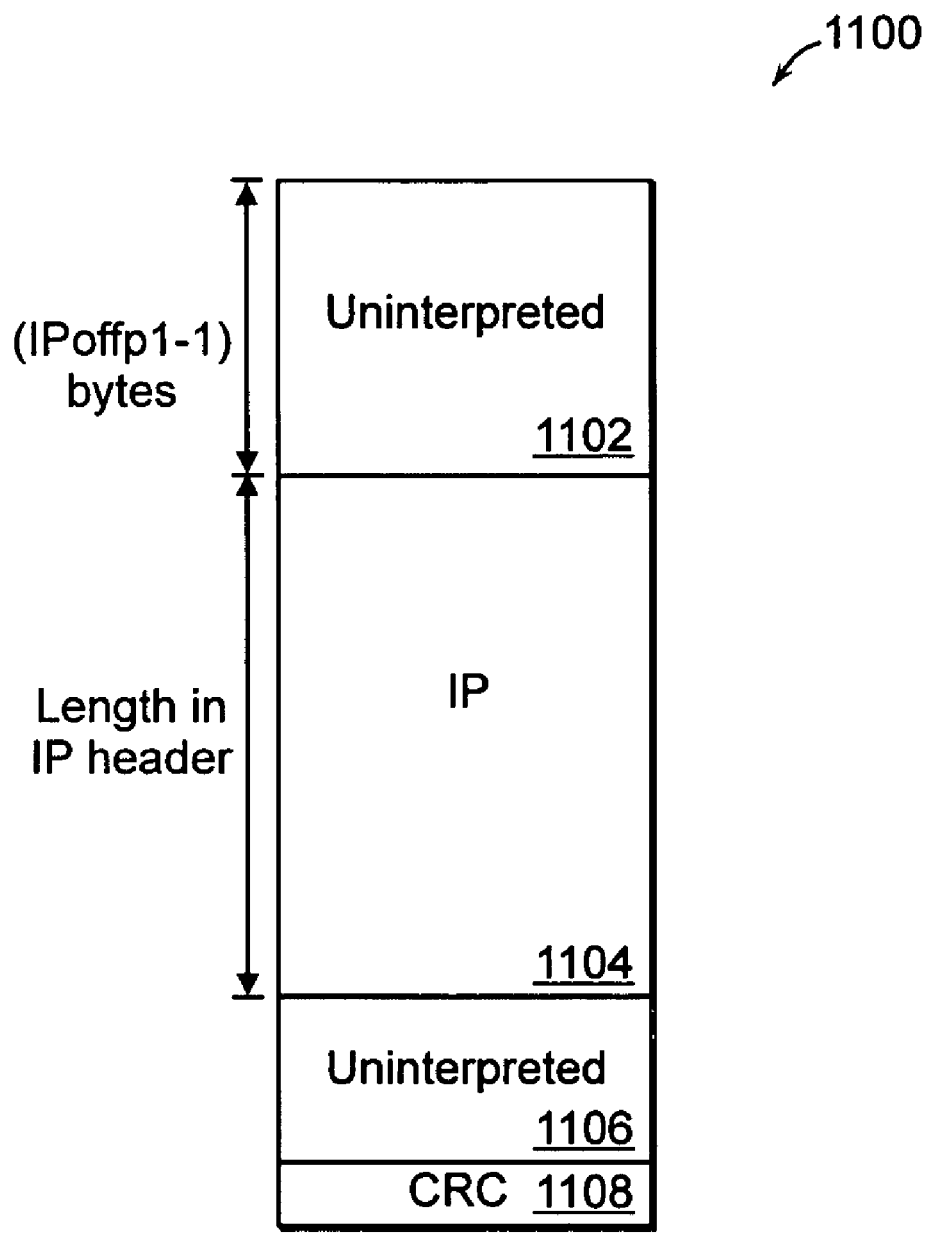
FIG. 11 is a block diagram illustrating the format of packets entering and exiting the PKO unit.

FIG. 11 is a block diagram illustrating the format of a packet 1100 entering and exiting the PKO unit 218. The packet 1100 includes a first uninterpreted number of bytes 1102, a second uninterpreted number of bytes 1106, an optional CRC 1108 if the packet is received through a SPI4.2 port and an IP header 1104. The IP header 1104 is present if an IPOffp1 field 806 (FIG. 8) in a command 708 for a packet directs the PKO unit 218 to calculate a TCP/UDP checksum.

If the command 708 for a packet does not direct the PKO unit 218 to calculate a TCP/UDP checksum, there is no format requirement. The PKO unit simply interprets the output packet data as a byte stream and optionally (for output ports other than PCI) appends a CRC code generated by the CRC generation logic 600 that covers all the prior bytes in the packet. The packet may contain an L2 header, an IP header, and other fields, but the PKO unit 218 does not interpret them.

If the command 708 for a packet 1100 directs the PKO unit 218 to calculate a TCP/UDP checksum, the command also contains a POffp1 field 806 that indicates the location of the first byte of the IP header in the packet 1100. As shown, the packet includes IPoffp1-1 bytes that are not interpreted. The POffp1 field 806 indicates the start of the IP header in the packet 1100. The PKO unit generates a TCP/UDP L4 checksum for the packet 1100.

In order to compute the checksum, the protocol/next header field must be either TCP or UDP and reside in the packet. If IPv4, the option field 322 must be zero and must not be a fragment. If IPv6, the packet must not have any extension headers prior to the TCP/UDP header, that is, the next header field in the IPv6 header must be either TCP or UDP. In the UDP case, the PKO unit uses the UDP header length field to calculate the checksum, so the UDP length value must be legal, that is, it must not indicate that the UDP data is longer than the IP length allows.

Figure 12:
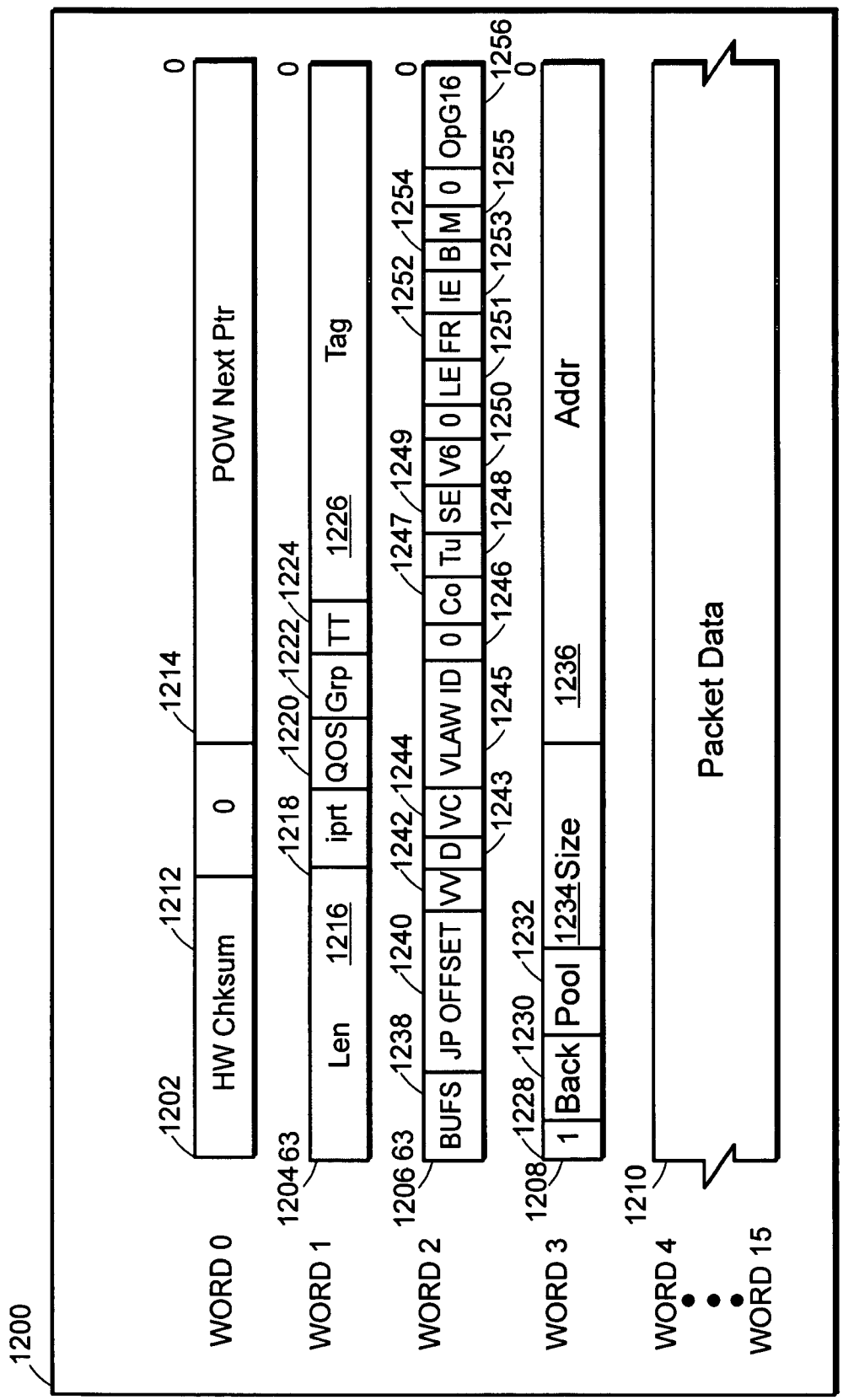
FIG. 12 illustrates a work queue entry that can be stored in L2 cache or DRAM.

FIG. 12 illustrates a work queue entry 1200 that can be stored in L2 cache 212 or DRAM 108. Words 1202, 1204 of the work queue entry 1200 are used by the Packet Order/Work (POW) module 228 to schedule work for the cores.

Word 1202 includes a hardware checksum field 1212 for storing a hardware checksum and a next pointer field 1214 for storing a pointer to the next work queue entry to implement a memory input queue. In one embodiment, the hardware checksum is a hardware generated 16 bit ones-compliment sum of the packet data that is calculated over the segment in the IPD unit 400. The next pointer field 1214 is used to link work queue entries.

Word 1204 includes a length field 1216, an input port (iprt) field 1218, a QOS field 1220, a Group field 1222, a TT field 1224 and a tag field 1226. The length field 1216 stores the total number of bytes of packet data in the work queue entry 1200. In an embodiment, the length can range from 1 to 65535 bytes. The input port field 1218 stores the input port that the packet arrived on. The QOS field 1220 stores an input queue in the POW module 228 selected by the packet input unit 1214. The packet input unit 1214 can select the input queue based on a default value per port or fields in the network protocols in the received packet, for example, based on VLAN ID, or a diffserv DSCP field. The group field 1222 stores a core group number for the work. The TT field 1224 stores the initial tag type of the work queue entry. The tag type can be null, ordered or atomic. The tag type can be different for IP and non-IP packets, IPv4 and IPv6 packets, and TCP and non-TCP packets. The initial tag value is assigned by the IPD unit 300 and can be based on the port number that the packet arrived on, the IP source and destination addresses, IP protocol next header value and the TCP/UDP source and destination ports. The POW module 228 reads the value of the QOS field to select an input queue. The POW module 228 also reads the value of the Group, TT and Tag fields when adding work to an input queue.

The tag field 1226 in word 1204 of the work queue entry allows each piece of work to be tagged. The packet input module 214 creates the initial tag information and stores it in the work queue entry 1200. For example, the packet input module 214 can create the tag by performing a hash of the standard TCP five-tuple (IP source address, IP destination address, IP protocol, TCP source port, TCP destination port) defining a "flow". The CRC-based algorithm, which is symmetric to interchange of source and destination, along with atomic tag types provides the means to eliminate nearly all of the software based locking in the TCP stack. The Packet/Order Work (POW) module 228 uses this initial tag information for synchronization, ordering, and scheduling. Two pieces of work are ordered and/or synchronized when they share the same tag value stored the tag field 1226 and tag type stored in the TT field 1224 of word 1204. Two pieces of work may be unrelated and can execute entirely in parallel on different cores 202 when they have a different tag or tag type values. The same flow will have the same tag value, so it is ordered and synchronized. Different flows will likely have different tag values, so will likely not be ordered and synchronized, and can be executed completely in parallel on different cores 202. Moreover, in the TCP stack, tag serves as the basis for the 5-tuple lookup. The tag calculation algorithm also uses some secret values that help to support security of the TCP stack Word 1206 stores information regarding the packet data, for example, information extracted from the packet headers during input packet processing. The information can include an indication as to whether a Virtual LAN identifier was found in the L2 protocol header or whether the packet is UDP or TCP. The information can also indicate whether the destination MAC address field in the L2 header is broadcast or multicast and whether the packet requires IPSec decryption. The information also includes the number of buffers used to store the packet data. By storing this additional information in the work queue entry, access to the TCP header data stored with the TCP segment in L2/DRAM is avoided thus accelerating processing of packets data for the TCP connection.

Figure 4:
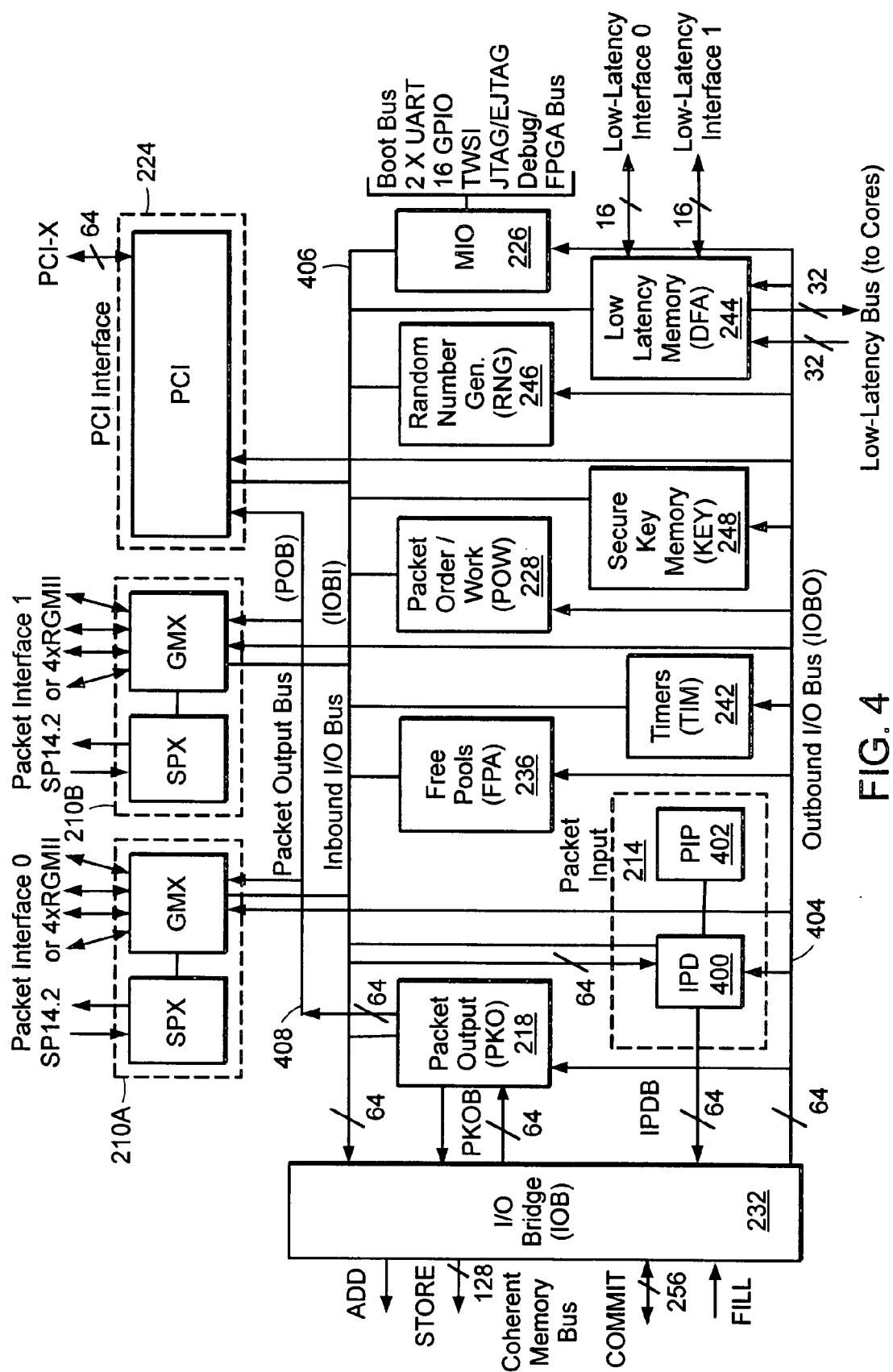
FIG. 4 is a block diagram illustrating the units for performing input and output packet processing in the network services processor shown in FIG. 2.

As shown in FIG. 4, word 1206 includes a bufs field 1238 that stores the number of buffers used to store the packet data. The IP offset field 1248 stores the number of bytes in the packet from the first byte of packet data to the first byte of the IP packet. The VV field 1242 indicates that a VLAN field was found in the L2 header for the packet. The VC field 1244 stores the VLAN CFI bit, that is bit 12 of the VLAN identifier in the L2 header. The VLAN ID field 1245 stores bits 0 through 11 of the VLAN identifier in the L2 header. The CO field 1249 indicates whether the IP packet is IPCOMP, that is the IPv4 protocol value or the IPv6 next header equals 108. The TU field 1248 is set when the IP packet is TCP or UDP, that is, when the IPv4 protocol value or the IPv6 next header equals 6 (TCP) or 17 (UDP). The SE field 1249 is set when the IP packet requires IPSEC decryption, when the packet is IPSEC ESP, that is the IPv4 protocol value or the IPv6 next header equal 50 or when the packet is IPSEC AH, that is, the IPv4 protocol or the IPv6 next header equals 51. The SE bit 1249 is also set if the packet is TCP, that is, the IPv4 protocol value or the IPv6 next header equal 6 and the TCP destination port matches one of four possible programmed values or when the packet is UDP, that is, the IPv4 protocol value or the IPv6 next header equals 17 and the UDP port matches one of four possible programmed values.

The V6 bit 1250 is set when the IP version number field is 6. The LE bit 1252 is set when the packet input unit 214 finds an error in the TCP/UDP header or the data. The corresponding error code is stored in the opcode field 1256. In one embodiment, the reported errors when the LE bit 1251 is set include malformed L4, L4 checksum error, UDP length error, bad L4 port, TCP packet with only FIN flag set, TCP packet with no flags set, TCP packet with both FIN and RST set, TCP packet with both SYN and URG set, TCP packet with both SYN and RST set and TCP packet with both SYN and FIN set.

The FR bit 1252 is set when the packet is a fragment. The IE bit 1254 is set when the packet has an IP exceptional condition. When the FR bit 1252 is set, the reported errors include the IP version field is neither 4 or 6 and the IPv4 header has a checksum violation, the packet is not long enough to contain the IP header, or the packet is not long enough to contain the bytes indicated by the IP header.

The B field 1254 is set when the packet's destination MAC address in the L2 header is the broadcast address, that is, all ones. The M bit 1255 is set when the packet's destination address is a multicast address, that is, the group bit is set, and at least one of the remaining bits is a zero.

Word 1208 is a buffer descriptor. The address field 1236 stores the address of the first byte of packet data in the buffer. The size field 1234 stores the number of bytes of packet data stored in the buffer. In one embodiment, the pool field 1232 and the I field 1228 are set to '0' and the back field 1230 stores the number of cache blocks from the address stored in the address field 1236 to the beginning of the buffer.

Words 1210 store packet data dependent on the type of packet. The format of the packet data stored in the queue entry is beyond the scope of the present invention.

Figure 13:
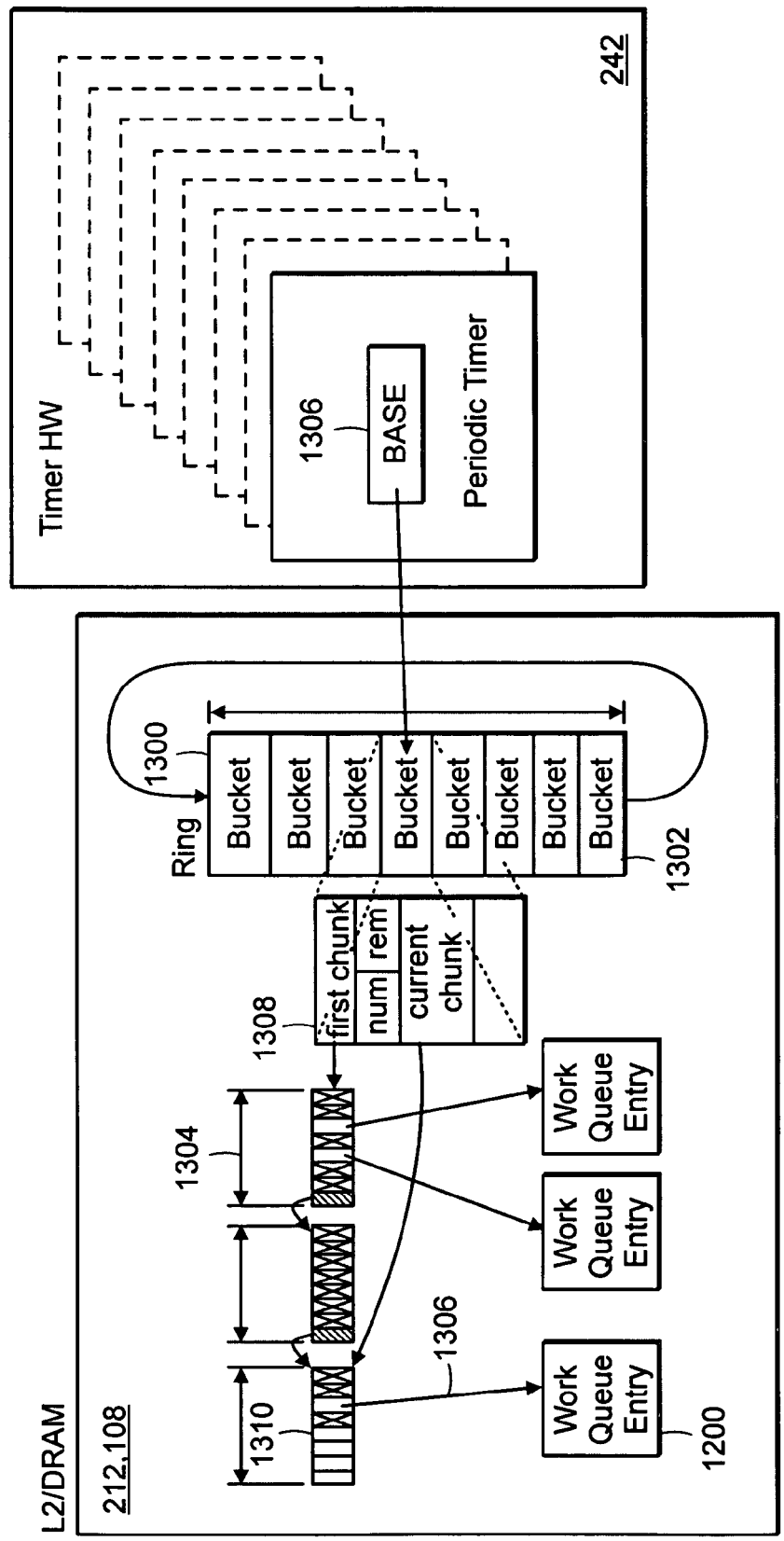
FIG. 13 is a block diagram of the timer unit shown in FIG. 2 including the rings stored in L2/DRAM that are managed by the timer unit.

FIG. 13 is a block diagram of the timer unit 242 shown in FIG. 2 and a ring 1300 stored in L2/DRAM 202, 108 that is managed by the timer unit 242. The timer unit 242 provides the ability to submit work queue entries 1200 at future times.

The timer unit manages a plurality of rings (queues) 1300 having a plurality of buckets 1302 that are stored in L2/DRAM memory 202, 108. FIG. 13 illustrates one of the rings 1300. In an embodiment with 16 processors (cores) 202, the timer unit 242 can assign a separate ring to each processor. By assigning a separate ring to each processor 202, synchronization between processors is avoided.

Each ring 1300 has a programmable number of buckets 1302. Each bucket 1302 in a ring 1300 corresponds to a different time slice, that is, a timer expiration at a different time. The next time increment is the next sequential entry in the queue (bucket array). The time interval between buckets 1302 is also programmable. Each bucket 1302 stores a list of chunks 1304. Each chunk 1304 has a plurality of timer entries 1302.

At each periodic bucket time expiration, the timer unit 242 processes the next bucket 1302 in the ring 1300. Each timer entry 1310 in a chunk 1304 in a bucket 1302 can store a work queue entry pointer 1306. Pointers to work queue entries are inserted into a chunk 1304 in an appropriate bucket. The chunks 1304 are freed to a pool of free chunks after they are no longer needed. The timer unit 242 also resets the bucket data structure. In one embodiment, the timer unit 242 traverses up to 80 million timer entries per second.

The rings 1300 are configured through two control status registers (CSRs). Each control status register has an entry corresponding to a core 202 in the network services processor 100.

FIG. 14 is a block diagram illustrating one of the entries 1400 in control status register 0 (CSR0) associated with one of the cores 202. The CSR0 entry 1400 includes a base pointer field 1406 for storing a base pointer to a ring 1300 associated with the core 202. The base pointer is a pointer to the first bucket 1302 in the ring. The ring identifier field 1402 stores a value used to select the ring 1300. The bsize field 1404 stores the number of buckets 1302 in the ring 1300.

FIG. 15 is a block diagram illustrating one of the entries 1500 in control status register 1 (CSR1). The CSR1 entry 1500 also has a ring identifier (RID) field 1502 for storing a value used to select the ring 1302. The interval field 1504 stores the time between bucket traversals. The csize field 1506 stores the chunk size, that is, the number of work queue entry pointers 1306 in each buffer chunk. The cpool field 1508 stores an identifier of the pool to which chunks are freed. The ena field 1510 stores a value indicating whether the ring timer is enabled. Through the use of work entry pointers, the timer unit 242 is integrated with the POW work queuing and is used to manage the scheduling of work to the cores 202.

Figure 16:
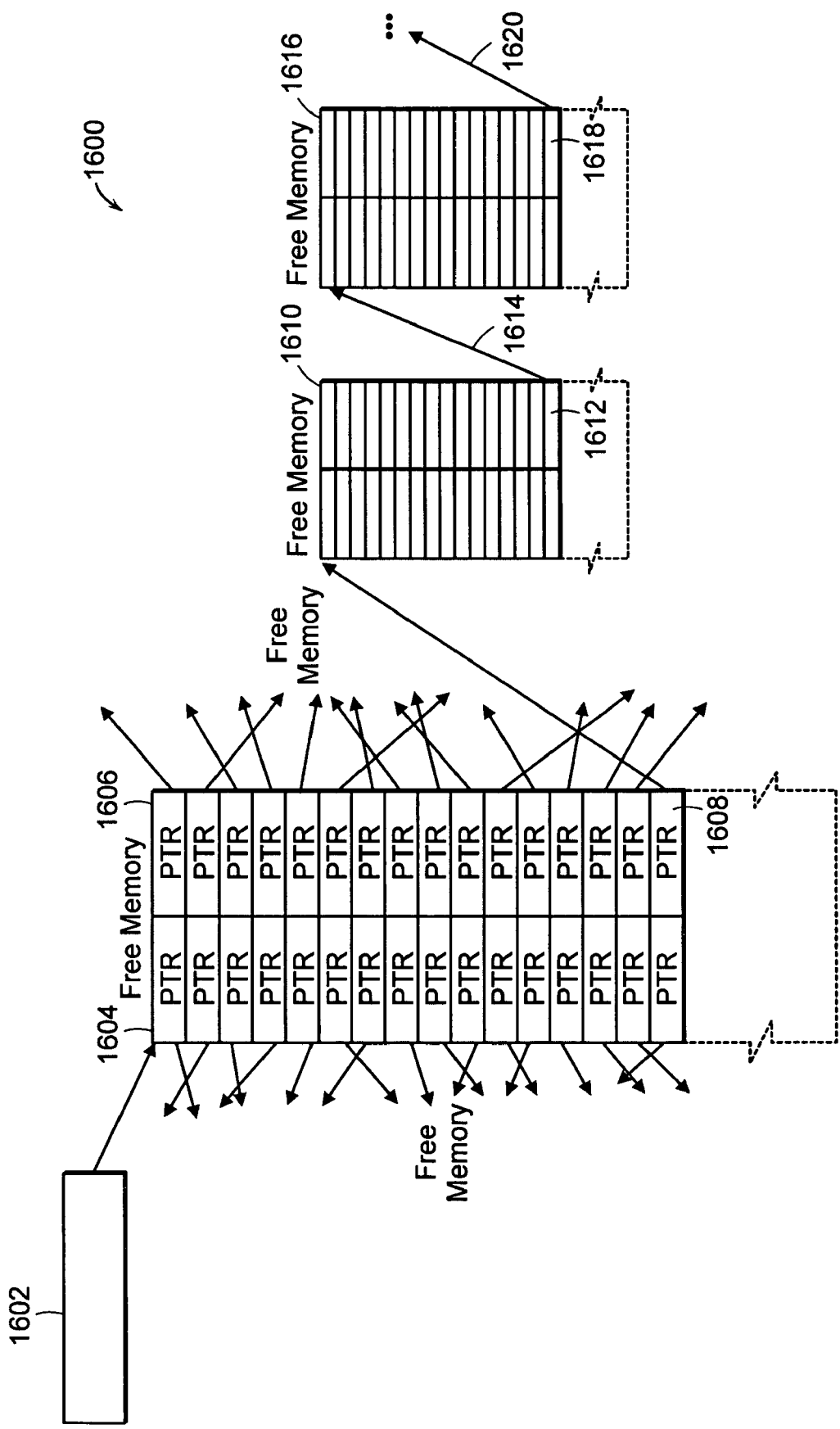
FIG. 16 is a block diagram illustrating the Free Pool Memory Unit free pointers.

FIG. 16 is a block diagram illustrating the Free Pool Memory Unit free pointers. The Free Pool Allocator (FPA) 236 manages pools of pointers to free memory (buffers) in L2/DRAM. The free memory is memory that is not currently in use and thus is available to be allocated for use to processors or other units in the network services processor. A processor 202 or the packet input unit 214 allocates memory from the pools and frees memory to the pools. The memory is also freed by other units in the network services processor such as the timer unit 242 described in conjunction with FIG. 13.

In one embodiment, the free pool allocator unit 236 manages eight pools of pointers to free memory. Each pool of pointers to free memory is implemented as a logical stack in Last In First Out (LIFO) order. While there is sufficient space in the free pool allocator 236 unit, all of the pointers are stored in the unit. However, the size of the pools is not limited by the available memory for storing pointers in the free pool allocator unit 236. As the pool of pointers grows, the pointers at the top of each logical stack are stored in the FPA unit 236 and the pointers at the bottom of the stack are stored in L2/DRAM through the use of a tree/list data structure in L2/DRAM 212, 108. The tree/list data structure uses free memory in the pool to store the additional pointers to L2/DRAM. Thus, the size of a pool of pointers to free memory is only limited by the size of L2/DRAM not by the available memory in the FPA unit 236.

In an embodiment, free pools are aligned on a 128 byte boundary and the free memory pointed to by the free memory pointer is at least 128 bytes. The size of the free memory pointed to by the free memory pointer can differ in each of the free memory pools and can also differ within the same pool of free memory.

The tree/list data structure 1600 is used to expand a pool of free memory pointers. As previously discussed, the tree/list data structure 1600 is stored in L2/DRAM to expand the pool of pointers when there is insufficient memory is available in the free pool unit for storing pointers.

A pointer 1602 to a first free memory block 1604 in L2/DRAM is stored in the FPA unit 236. The first free memory block 1604 stores pointers 1606 to other free memory blocks and the last pointer 1608 in the first free memory block stores a pointer to a next free memory block 1610 that also stores pointers to other free memory blocks. The last pointer 1612 stores a pointer 1614 to a subsequent free memory block 1616 in which the last pointer 1618 stores a pointer 1620 to another free memory block. In an embodiment in which each block stores 32 pointers, only one of the 32 pointers in each block is used to implement the linked list of pointers to free memory 1600.

In an embodiment, up to 2048 pointers to free memory are stored in the FPA unit 236. Each pool uses a programmable portion of these pointers. Thus, higher priority pools can have a larger portion of the in-unit pointers.

Figure 17:
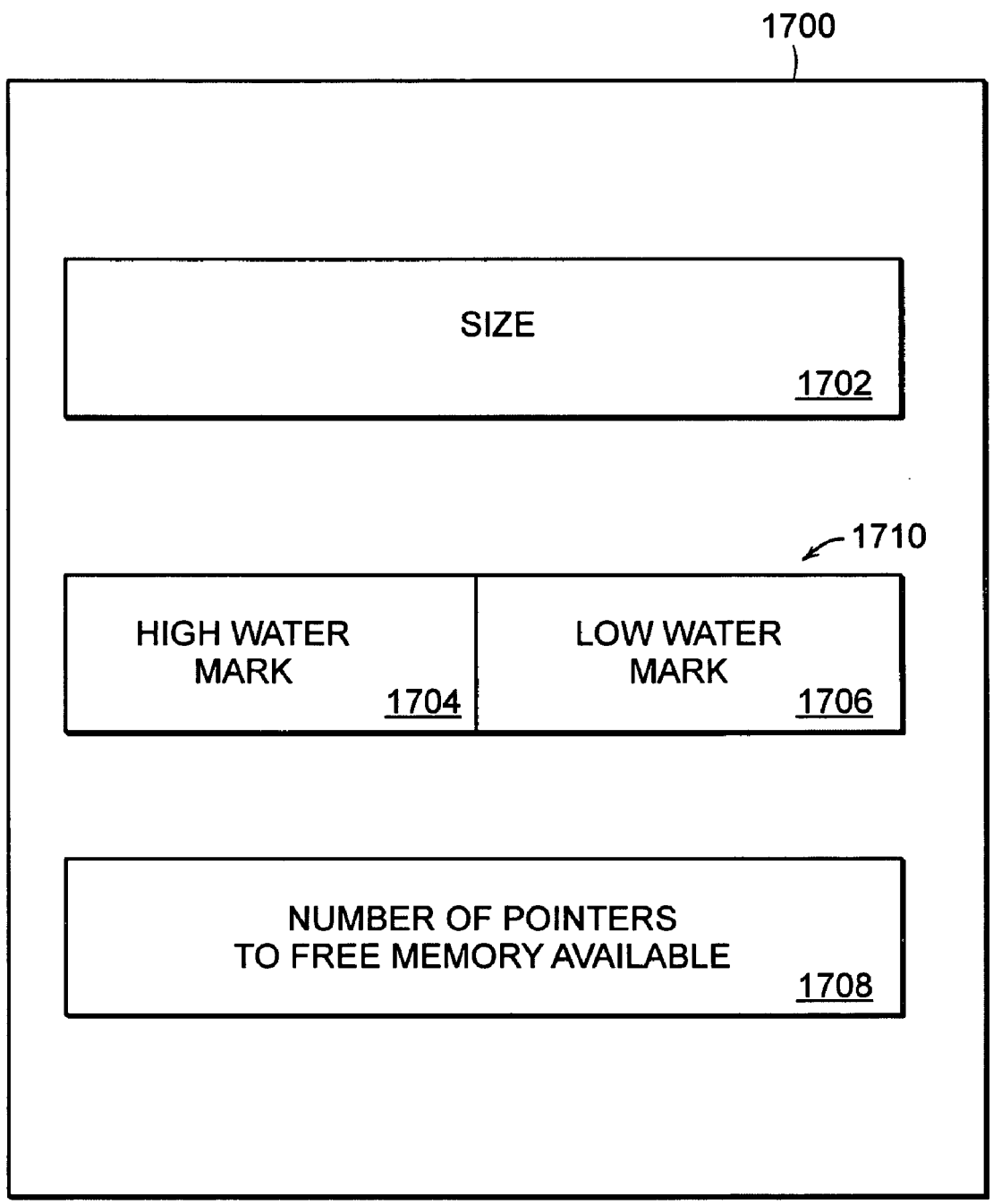
FIG. 17 is a block diagram illustrating registers for managing one of the eight pools in the FPA unit.

FIG. 17 is a block diagram illustrating registers for managing one of the eight pools in the FPA unit 236. Each pool has an associated size register 1702 and high and low watermarks for the number of in-unit pointers. The size register 1702 stores the number of entries assigned in memory in the FPA unit 236 to store pointers to free memory blocks for this pool (queue). The low and high water mark register 1710 has a low water mark field 1706 and a high water mark field 1704. When the number of free-page in-unit pointers for the queue drops below the value stored in the low water mark field 1706, the FPA unit 236 moves one page of pointers from DRAM 68 to FPA in unit memory. The move is performed by reading the page of pointers from DRAM and writing the page of pointers to the FPA unit. When the number of in-unit free-page pointers for the queue exceeds the value stored in the high water mark field 1704, the FPA unit 236 moves one page of pointers in the in-unit queue to L2/DRAM. The move is performed by reading the page of pointers from the in-unit queue and writing the page of pointers to L2/DRAM. In an embodiment, a page of pointers has 32 pointers.

The number of pointers field 1708 stores the number of entries assigned in the FPA memory for storing page pointers for this queue.

Figure 18:
FIG. 18 illustrates the format of a load operation instruction.

The FPA unit 236 services requests for page pointers and returns page pointers in the order of queue number, with queue 0 having the highest priority. In an embodiment in which queue 0 is assigned to the packet input unit 214, the allocation of memory for storing received packets is highest priority. The format of a load operation is shown in FIG. 18. The load operation 1800 is sent to the FPA unit 236 by a core 202 or other units in the network services processor to obtain (allocate) a pointer to free memory. The load operation includes a field 1802 for indicating the pool number from which the pointer to free memory is requested. In an embodiment with eight queues (pools), the field has three bits to uniquely identify one of the eight queues (0-7). Upon receiving the instruction, the FPA unit returns a pointer to free memory from the selected queue. If the selected queue is empty, a NULL pointer is returned, that is, all bits in the pointer are set to zero.

Figure 19:
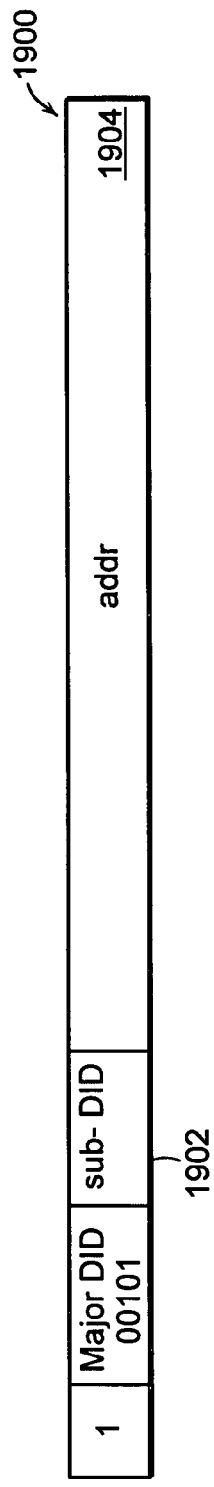
FIG. 19 illustrates the format of a store operation instruction for storing a pointer in a pool managed by the FPA unit.

FIG. 19 illustrates the format of a store operation for storing a pointer in a pool managed by the FPA unit. The store operation 1900 includes a subdid field 1902 for selecting the pool (queue) to which the pointer to a free memory block is to be added. The store operation 1900 also includes an address field 1904 that stores the pointer to available memory. In an embodiment, the pointer is aligned on a 128-byte boundary and points to at least 128 bytes of free memory.

Figure 20:
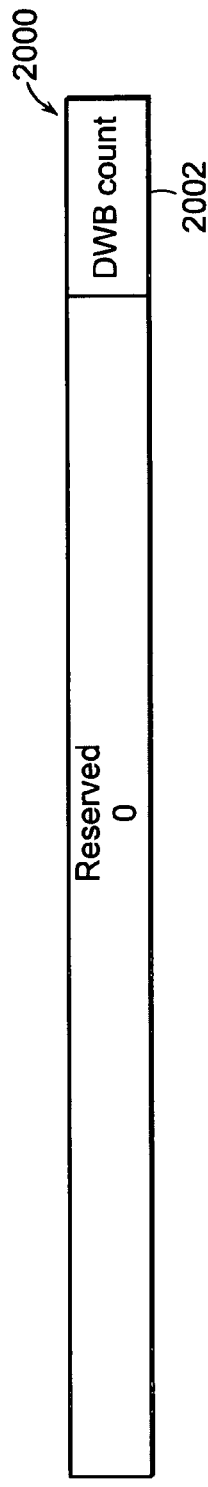
FIG. 20 illustrates the format of store data sent with the store operation instruction.

FIG. 20 illustrates the format of store data 2000 sent with the store operation 1900. The store data 2000 includes a DWB count field 2002 for storing the number of cache lines for which the IOB should try to execute "don't write back commands". Don't write back commands are issued by the IOB to reduce the number of cache lines to be written back to L2 cache. The Don't Write Back command is described in copending U.S. patent application Ser. No.: 11/030,010, filed Jan. 5, 2005 entitled Method and Apparatus for Managing Write Back Cache, the contents of which are incorporated herein by reference.

Thus, packet processing is accelerated through the use of input packet processing, work queue entries, output packet processing, work ordering and work scheduling in the network packet processor. The acceleration of packet processing is not limited to a TCP/UDP connection. The acceleration also applies to packets transferred using any other connection oriented protocols.

While this invention has been particularly shown and described with references to preferred embodiments thereof, it will be understood by those skilled in the art that various changes in form and details may be made therein without departing from the scope of the invention encompassed by the appended claims.

What is claimed is:

1. An accelerator for accelerating packet processing for packets transferred over a network using a connection oriented protocol comprising:
   a packet processing unit configured to perform pre-processing on a transport layer network protocol header encapsulated in a received packet for a connection, allocate a work queue entry for the received packet, and store data extracted from the transport layer network protocol header in the work queue entry and tag information defining how the work queue entry is synchronized and ordered;
   a packet order unit configured to synchronize and order processing of the work queue entry based on the associated tag information; and
   a timer unit configured to schedule processing of the work queue entries by at least one processor.

2. The accelerator of claim 1, wherein the transport layer network protocol is Transmission Control Protocol.

3. The accelerator of claim 2, further comprising a fetch and add unit for maintaining statistical information of the Transmission Control Protocol.

4. The accelerator of claim 1, wherein the transport layer network protocol is User Datagram Protocol.

5. The accelerator of claim 1, wherein the packet processing unit performs inline network transport layer checksum insertion for the processed packet prior to transmitting the processed packet over the network.

6. The accelerator of claim 1 further including a free pool allocator configured to manage a pool of free buffers for storing the received packets, each pool of free buffers having an assigned priority and a programmable number of buffers available in the free pool allocator.

7. The accelerator of claim 6, wherein each pool of free buffers is expandable through the use of buffers in a memory accessible by the free pool allocator.

8. The accelerator of claim 1, wherein the timer unit includes a plurality of queues, each queue assigned for scheduling received packets to be processed by one of a plurality of processors.

9. A method for accelerating processing of packets transferred over a network using a connection oriented network protocol, comprising:
   performing pre-processing on a transport layer network protocol header encapsulated in a received packet for a connection;
   allocating a work queue entry for the received packet;
   storing data extracted from the transport layer network protocol header in the work queue entry for processing the received packet and tag information for defining how the work queue entry is synchronized and ordered;
   synchronizing and ordering processing of the work queue entry based on the associated tag information; and
   scheduling processing of the work queue entries by at least one processor.

10. The method of claim 9, wherein the transport layer network protocol is the Transmission Control Protocol.

11. The method of claim 9, wherein the transport layer network protocol is the User Datagram Protocol.

12. The method of claim 9 further comprising:
   performing inline network transport layer checksum insertion for the processed packet prior to transmitting the processed packet over the network.

13. The method of claim 9 further including managing a pool of free buffers for storing the received packets, the pool of free buffers has an assigned priority and a programmable number of buffers in a free pool allocator.

14. The method of claim 13, wherein the pool of free buffers is expandable through the use of buffers accessible by the free pool allocator.

15. The method of claim 9, wherein scheduling comprises:
   assigning one of a plurality of queues for scheduling received packets to be processed by one of a plurality of processors.

16. An accelerator for accelerating packet processing for packets transferred over a network using a connection oriented protocol, comprising:
   means for performing pre-processing on a transport layer network protocol header encapsulated in a received packet for a connection;
   means for allocating a work queue entry for the received packet;
   mean for storing data extracted from the transport layer network protocol header in the work queue entry for use by the processor for processing the received packet and tag information for defining how the work queue entry is synchronized and ordered;
   means for synchronizing and ordering processing of the work queue entry based on the associated tag information; and
   means for scheduling processing of the work queue entries by at least one processor.

* * * * *

UNITED STATES PATENT AND TRADEMARK OFFICE
CERTIFICATE OF CORRECTION

PATENT NO.         : 7,535,907 B2
APPLICATION NO.    : 11/218727
DATED              : May 19, 2009
INVENTOR(S)        : Muhammad R. Hussain et al.

Page 1 of 1

It is certified that error appears in the above-identified patent and that said Letters Patent is hereby corrected as shown below:

On the Title Page

Item (73) Assignee: Delete "Oavium" and insert -- Cavium --

Claim 16, column 20, line 56, delete "mean" and insert -- means --

Signed and Sealed this

Twenty-first Day of July, 2009

JOHN DOLL
*Acting Director of the United States Patent and Trademark Office*